United States Patent [19]

Kai

[11] Patent Number: 5,619,735

[45] Date of Patent: Apr. 8, 1997

[54] OPTICAL APPARATUS FOR CORRECTING IMAGE DEVIATION

[75] Inventor: Tadao Kai, Kawasaki, Japan

[73] Assignee: Nikon Corporation, Tokyo, Japan

[21] Appl. No.: 628,192

[22] Filed: Apr. 5, 1996

Related U.S. Application Data

[63] Continuation of Ser. No. 417,473, Apr. 5, 1995, abandoned, which is a continuation of Ser. No. 129,580, Sep. 30, 1993, abandoned, which is a continuation of Ser. No. 853,256, Mar. 18, 1992, abandoned.

[30] Foreign Application Priority Data

| Mar. 22, 1991 | [JP] | Japan | 3-083666 |
| Dec. 9, 1991 | [JP] | Japan | 3-349505 |

[51] Int. Cl.$^6$ ................................. G03B 13/00
[52] U.S. Cl. ................................. 396/55
[58] Field of Search ................ 354/286, 202; 359/554, 557; 355/52; 396/52, 55

[56] References Cited

U.S. PATENT DOCUMENTS

| 2,959,088 | 11/1960 | Räntsch | 88/1 |
| 3,650,596 | 3/1972 | Thevenaz | 350/16 |
| 4,733,278 | 3/1988 | Negoro | 355/58 |
| 4,970,540 | 11/1990 | Vasey et al. | 354/202 |
| 4,974,950 | 12/1990 | Yamazaki et al. | 359/557 |
| 4,996,545 | 2/1991 | Enomoto et al. | 359/557 |
| 5,130,729 | 7/1992 | Sato et al. | 354/202 |
| 5,266,988 | 11/1993 | Washisu | 354/70 |

FOREIGN PATENT DOCUMENTS

| 0391533 | 10/1990 | European Pat. Off. . |
| 64-1918 | 1/1989 | Japan . |
| 2-120821 | 5/1990 | Japan . |
| 2-162320 | 6/1990 | Japan . |
| 2-234115 | 9/1990 | Japan . |
| 669271 | 2/1989 | Switzerland . |
| 1417516 | 12/1975 | United Kingdom . |

OTHER PUBLICATIONS

Patent Abstracts of Japan, vol. 14, No. 462 (P-1113) 5 Oct. 1990.

*Primary Examiner*—David M. Gray
*Attorney, Agent, or Firm*—Shapiro and Shapiro

[57] ABSTRACT

With a simple structure, a reliable driving control is obtained for a corrective optical system for correcting an image deviation resulting from unsteady motions caused by a manual holding of an apparatus.

A corrective optical system for correcting an image deviation is movably supported in a plane perpendicular to the optical axis. There are provided a drive for driving this system and a movable member operated by this drive to provide a corrective motion accompanying a rotational component when it is driven. There are also provided a detector fixed to this movable member for detecting its angle variations with respect to the inertial system as well as means for controlling the operation of the drive. The shifting amount D' of the corrective optical system for correcting an image deviation d ($=f\cdot\theta$) at a variation angle $\theta$ of the optical axis of the optical system having a focal length f is D'=D/A (where A=a proportional coefficient and D=an image shifting amount). In response thereto, the movable member is controlled to make its angle variation $-\theta$ with respect to the optical system. Hence performing the correction of an image deviation.

101 Claims, 14 Drawing Sheets

OPTICAL APPARATUS FOR CORRECTING IMAGE DEVIATION

This is a continuation of application Ser. No. 08/417,473 filed Apr. 5, 1995, which is a continuation of application Ser. No. 08/129,580 filed Sep. 30, 1993, which is a continuation of application Ser. No. 07/853,256 filed Mar. 18, 1992, all now abandoned.

BACKGROUND OF THE INVENTION

1. Field of the Invention

The present invention relates to an image deviation correcting optical apparatus to drive a corrective optical system for correcting the optical axis deviation of a lens barrel when a picture is taken by a hand-held camera.

2. Related Background Art

There has already been proposed a corrective optical system in which a part of an optical system (or the entirety thereof as a matter of course) in an optical apparatus is structured as a corrective optical system in order to correct image deviation (blurred image by shake) due to unsteady motions given to the optical apparatus.

For example, in Japanese Patent Laid-Open Application No. 2-120821, an image deviation correction apparatus is disclosed. This apparatus comprises a deviation detector and a deviation correcting optical system, and the aforesaid deviation detector is structured to serve also as a detector for detecting the working amount of the corrective optical system.

Also, an optical supporting mechanism for a corrective optical system (Japanese Patent Laid-Open Application No. 2-162320) is known as an apparatus of the kind, in which there are provided a plurality of substantially rigid long beams supported by a fixed body. The beams are extended in the direction of the optical axis and at the same time, are allowed to rotate around the directions of two axes perpendicular to the optical axis and intersecting at right angles to each other, respectively, but not allowed to rotate around the optical axis. Optical systems are connectively supported at the respective oscillating ends of these beam members through the joints which are slantedly movable.

Although the above-mentioned correction apparatuses conventionally known are applicable to an ideally thinned single lens, there is an unavoidable problem space-wise that when they are applied to an exchangeable lens for an interchangeable lens camera, it is difficult to mount a deviation detector which dually functions to detect the working amount of the corrective optical system because of the existing thickness of the body side.

Further, there is a drawback from the standpoint of the space availability for the mounting of the deviation detector to be adopted for the lens groups of complex structures often employed for a still camera and the like, such as proposed by the assignee hereof in Japanese Patent Laid-Open Application No. 2-234115 wherein a rear lens group is driven for the required deviation correction.

Also, in the conventional apparatuses described above, the constituents of the deviation detector are divided to be members which form the housing for the optical apparatus and those which construct the corrective optical system. As a result, there is encountered a problem that it takes a considerable time to mount them and make the necessary adjustment therefore. It is therefore desired that an effective measure should be taken to solve this problem too.

Particularly, in the above-mentioned conventional example disclosed in the Japanese Patent Laid-Open Application No. 2-120821, the distance from the corrective optical system (that is, a focusing lens which can be shifted) to the reflective mirror of the hydrostatic sensor must be more than half of the distance to the film plane according to an embodiment shown in FIG. 9 thereof.

In other words, given a deviation angle as $\theta$ and a lens focal length as f, an image deviation amount $D=f\times\theta$ (in a case of an object in a long distance, the description will be made on this assumption in the present specification). Then, a driving amount D' of the corrective optical system required to correct the image deviation amount in this case is D'=D. Therefore, given the distance between the corrective optical system (a focusing lens which can be shifted) and the reflective mirror of the hydrostatic sensor as A, it is necessary to satisfy a condition of $2\times A\times\theta=f\times\theta$, $2\times A=f$.

Notwithstanding, this condition is too severe for a conventional structure to satisfy because in the case of the exchangeable lens, the space behind its mounting position cannot suitably be utilized.

Also, in an apparatus having the structure of an optical system for a vibration proof telephotographic lens disclosed in the above-mentioned Japanese Patent Laid-Open Application No. 2-234115, the usual condition is $D \approx D'$ in order to maintain its optical performance. Nevertheless, it is necessary to make the distance A from the corrective optical system to the film plane to be A<<f. Therefore, even if the lens systems are integrally provided with the body, it is impossible to secure the distance A. Most of the usual lenses for a camera are of such a structure as this, and if D'<D, A can be made small, but to deviate from "=" results in creating many difficult problems with respect to the optical performance, and this should be taken into account.

In the aforesaid conventional structure, the beam members are caused to oscillate rotatively around the axes respectively in the two-axis directions perpendicular to the optical axis and intersecting at right angles with each other. The oscillation in the direction of the optical axis of the corrective optical system (cosine error) is generated by the structural driving. Accordingly, the focal position is deviated in the direction of the optical axis.

Also, in order to minimize the aforesaid cosine error, a comparatively heavy corrective optical system should be arranged at a position which is comparatively far away from the rotational shaft of the supporting mechanism. As a result, the moment created by its dead weight becomes great, and the weight (balancing member) to keep the supporting mechanism balanced becomes unavoidably heavy. Thus the reaction due to the driving tends to be great, and there is a danger that the image deviation created by unsteady hands and the like is intensified depending on the direction in which the reaction is generated.

In addition, the corrective optical system is supported by the long beam members and the slantedly movable joints are used for connecting the supporting member and corrective optical system. There tends to occur self-sustained vibration due to deflection or the like in driving the mechanism. Hence a problem of strength is encountered.

SUMMARY OF THE INVENTION

An image deviation correcting optical apparatus according to a first aspect of the present invention is provided with a corrective optical system which is movably supported in the plane perpendicular to the optical axis in order to correct the image deviation, driving means for driving this corrective optical system, a movable member constituting a part of this driving means or being interlocked therewith to provide a corrective motion accompanying a rotational component when the aforesaid driving means performs its driving, angular variation detecting means fixed to the movable member for detecting rotation relative to a predetermined point of origin of an inertial system, and control means for controlling the operation of the aforesaid driving means. The apparatus is structured so as to drive the aforesaid movable member to make its angular variation to be −θ with respect to the optical apparatus in response to the shifting amount D' of the corrective optical system (D'=D/A; A=coefficient and D=image shifting amount) for correcting an image deviation (d=f·θ) at an optical axis variation angle θ of the optical apparatus (the focal length of the entire system=f), thus making it possible for this movable member to move in accordance with the shifting amount D' of the corrective optical system so that this movable member is substantially maintained at a constant angular position relative to the predetermined point of origin of the inertial system.

Further, a control means for controlling a driving means to drive the corrective optical system is operated to control the driving means so that the output of the angular variation detecting means is caused to approach a static output, or to control the driving means so that the last operating state of the driving means is maintained.

With the structure described above, a part of the means to drive the image deviation corrective optical system is arranged so as not to be rotated following the shifting amount D' of the corrective optical system. Consequently, it becomes possible to drive the corrective optical system for the execution of the appropriate image deviation correction by operating the control means to enable the driving means to orient the output of the angular variation detecting means toward the static output.

Also, in the corrective optical system driving apparatus which drives a corrective optical system for correcting the deviation of the optical axis of a lens barrel, an image deviation correcting optical apparatus according to a second aspect of the present invention is provided with a driving shaft for driving the aforesaid corrective optical system, a driving unit fixing member with its first central axis of rotation and the sliding axis line of its slider receiving portion being arranged in parallel with the optical axis of the lens barrel, a driving arm rotatively supported around the first central axis of rotation of the aforesaid driving unit supporting member with its second central axis of rotation at a position apart from the first central axis of rotation by a predetermined distance between the axes, and a driving shaft supporting member, with a slider thereof which slides along the aforesaid slider receiving portion and the aforesaid driving shaft being mounted in alignment with positions on a straight line through the second central axis of rotation and the second central axis of rotation being centrally disposed between the aforesaid positions at a distance from each position equal to the predetermined distance between the axes. The aforesaid driving shaft supported by the aforesaid driving shaft supporting member is caused to be shifted in the direction perpendicular to the optical axis of the aforesaid lens barrel when the aforesaid driving arm is oscillated to allow the aforesaid slider to slide along the aforesaid slider receiving portion.

In this case, it is possible to provide a balancing member which is balanced with the aforesaid corrective optical system at the other end of the aforesaid driving arm, and the distance from the aforesaid balancing member to the first central axis of rotation is longer than the distance from the first central axis of rotation to the aforesaid second central axis of rotation. Also, the aforesaid balancing member is characterized by enabling it to be rotative in the direction opposite to the shifting direction of the aforesaid corrective optical system with respect to the aforesaid first central axis of rotation. The aforesaid balancing member is further characterized by being positioned forwardly in the aforesaid direction of the optical axis with respect to the aforesaid first central axis of rotation.

Also, it is possible to arrange the structure so as to mount on the other end of the aforesaid driving arm a shifting amount detecting member capable of enlarging a shifting amount of the aforesaid driving shaft for detection.

It is further possible to arrange the structure so as to provide a pair of the aforesaid driving shafts, driving unit supporting members, driving arms, and driving shaft supporting members, respectively, and the aforesaid pair of driving shafts support the aforesaid corrective optical system at positions disposed at right angles with each other in the plane perpendicular to the direction of the aforesaid optical axis. Then, when one of the aforesaid driving shafts is driven, the aforesaid corrective optical system is shifted in the axial direction of the other one of the aforesaid driving shafts.

According to the present invention, the slider is caused to slide along the slider receiving portion by oscillating the driving arm, and the driving shaft supported by the driving shaft supporting member is caused to shift in the direction perpendicular to the optical axis of the lens barrel.

Also, it is possible to maintain the balance of the entire system in a static state by an extremely light balancing member. Hence improving the portability and operability of the lens barrel. In this case, if the balancing member is arranged further forward than the corrective optical system and is driven in the direction opposite to the shifting direction of the corrective optical system, a driving momentum is exerted in the direction to offset the unsteady motion given by hands when a picture is taken by a hand-held camera. Furthermore, the distance between the gravitational position of the corrective optical system and the central axis of rotation is comparatively short while the corrective optical system is driven in the direction perpendicular to the optical axis. Therefore, the oscillation of the corrective optical system is not generated in the direction of the optical axis.

Moreover, it is possible to make the apparatus compact as a whole and highly rigid because the distance between the gravitational position of the corrective optical system and the central axis of rotation is comparatively short, and particularly, each of the driving shafts for driving the corrective optical system comprises an integrally formed straight member while the corrective optical system is slidably shifted in the axial direction of the driving shaft. Thus, the structural strength is intensified against the tilt and torsion of the corrective optical system with respect to the optical axis as its center.

BRIEF DESCRIPTION OF THE DRAWINGS

FIG. 11 is a schematic view showing a state of the second embodiment being mounted for a telephotographic lens.

FIG. 12 is a view illustrating the operation of the second embodiment which is in a state of being mounted for a telephotographic lens.

DETAILED DESCRIPTION OF THE PREFERRED EMBODIMENTS

Figure 1:
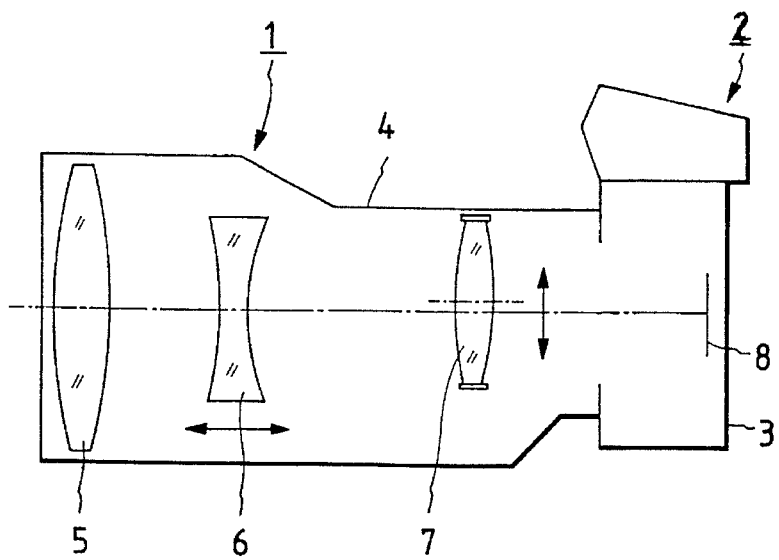
FIG. 1 is a view schematically illustrating the structure of a preferable still camera to which an image deviation correcting apparatus according to the present invention is applicable.

FIG. 1 through FIG. 7 illustrate a first embodiment of an image deviation correcting apparatus according to the present invention, and these figures represent a case where the present invention is applied to an image deviation (shake) preventive lens (telephotographic lens) for a still camera shown in FIG. 1.

At first, the brief description will be made of the still camera 2 shown in FIG. 1 provided with a telephotographic lens 1 with an image deviation preventive function to which the present invention is applicable. In FIG. 1, a reference numeral 3 designates a camera body. In the center of its front part, a lens barrel 4 comprising a telephotographic lens 1 is provided. In this lens barrel 4, a first lens group constituting a phototaking lens optical system formed by a fixed lens 5, a second lens group formed by a focusing lens 6, and a third lens group formed by an image deviation corrective lens 7 are respectively arranged along the optical axis.

The details of a phototaking lens of the kind may be based on the structure and others disclosed in the Japanese Patent Laid-Open Application No. 2-234115 and others which the assignee hereof previously proposed, but, here, in order to simplify the description, the representation is a schematic illustration of a three-group construction of a convex lens, concave lens, and convex lens.

The image deviation corrective lens 7 which constitutes the third lens group in the above-mentioned optical system is movably arranged in the plane intersecting at right angles to the optical axis, and by the shifting thereof, the image deviation (blurred image by shake) due to unsteady movements given to the camera is corrected.

Also, in FIG. 1, a reference numeral 8 designates a film. The still camera 2 is provided with various mechanical components required for a camera such as a release button and the like, but the details of those components are well known. Therefore, the descriptions thereof will be omitted.

FIG. 2 through FIG. 5 illustrate in detail the image deviation corrective lens 7 and its driving mechanism 10, which constitute the image deviation corrective optical system whereby the present invention is characterized.

Figure 2:
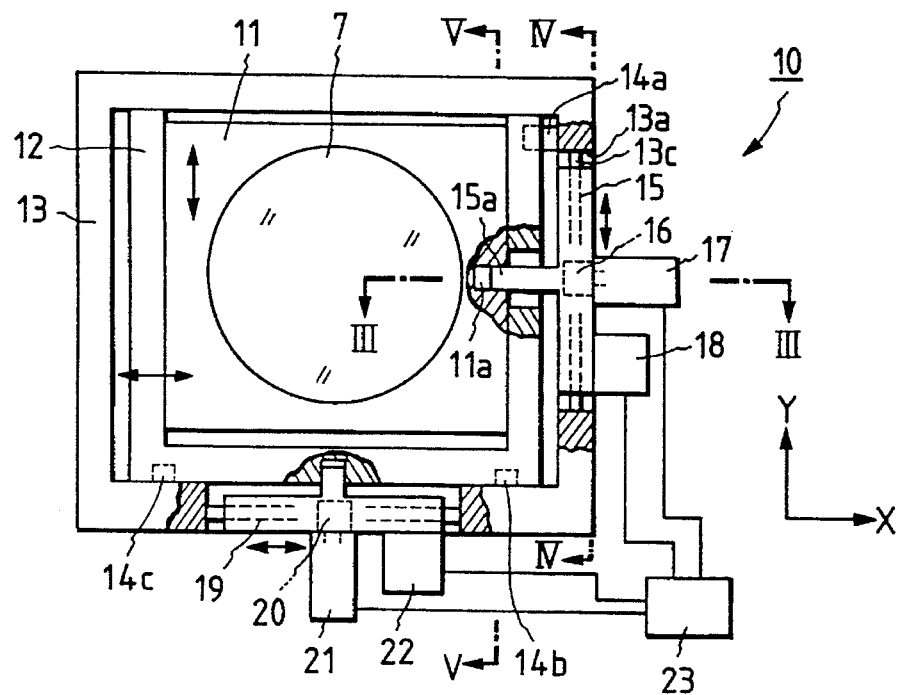
FIG. 2 is a schematic front view illustrating an image deviation corrective optical system and the driving mechanism representing a first embodiment of an image deviation correcting apparatus according to the present invention.

In FIG. 2 through FIG. 5, the structure of the principal parts will be described mostly in conjunction with FIG. 2. A reference numeral 11 designates a corrective optical system frame which functions as a Y-stage by shifting itself vertically in FIG. 2 as described later while holding the above-mentioned image deviation corrective lens 7; 12, an X-stage which is movable in the left and right hand directions in FIG. 2 while holding this corrective optical system frame 11 movably in the vertical direction in FIG. 2. This X-stage 12 holds the corrective optical system frame 11 by sandwiching it both from the left-hand and right-hand sides thereof and, at the same time, has a guiding function to guide the corrective optical system frame 11 in the direction Y. In this respect, the structure is of a nesting type with respect to the corrective optical system frame 11 so as to prevent its swing and tilt (tilt in the direction perpendicular to the plane of FIG. 2).

A reference numeral 13 designates a fixed frame provided with a guide function in the direction X of the X-stage 12, which is arranged to surround the outer periphery of the X-stage 12 so as to hold the X-stage 12 movably in the left and right hand directions while sandwiching the stage to hold it vertically in FIG. 2. This fixed frame 13 is provided by being fixedly mounted on the lens barrel (housing) of the telephotographic lens 1 which serves as an optical apparatus.

Reference numerals 14a, 14b, and 14c in FIG. 2 designate the guide nails which are provided in the inner side of the fixed frame 13 each in a set of two pins, respectively, to prevent the swing and tilt (tilt in the direction perpendicular to the plane of FIG. 2) of the X-stage 12 with respect to the fixed frame 13.

A reference numeral 15 designates a Y-driving slider. This Y-driving slider 15 represents the circular state of a radius R of rotation (which will be described using FIG. 6) as clear from FIG. 4, and the circular groove 13a of the fixed frame 13 is movably provided accordingly. Also, a cylindrical projection 15a which is projectingly provided on a part of this Y-driving slider 15 is fitted into an elongated hole 11a (refer to FIG. 5) of the corrective optical system 11 thereby to enable the Y-driving slider 15 to drive the corrective optical system 11 in the direction Y. Here, reference numerals 13b and 13c in FIG. 4 designate the guide rail portions which engage with the guide grooves of the Y-driving slider 15.

Figure 6:
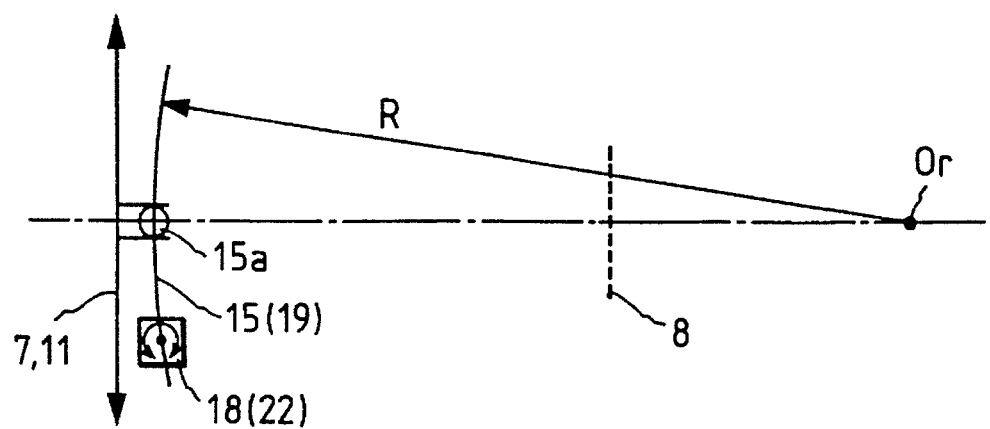
FIG. 6 is a schematic view illustrating the driving operation of an image deviation corrective system.

The radius R of rotation which forms the circular state of the Y-driving slider 15 is shown in FIG. 6. It is a prerequisite in the present invention that the center of the cylindrical projection 15a which is provided on a part of the Y-driving slider 15 is positioned on the locus of this radius R of rotation.

Figure 3:
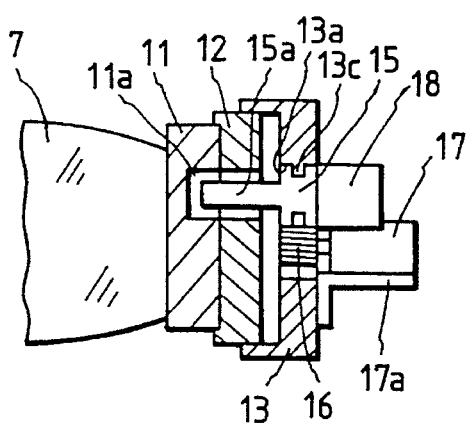
FIG. 3 through FIG. 5 are cross-sectional views taken respectively at the lines III—III, IV—IV, and V—V in FIG. 2.
Figure 4:
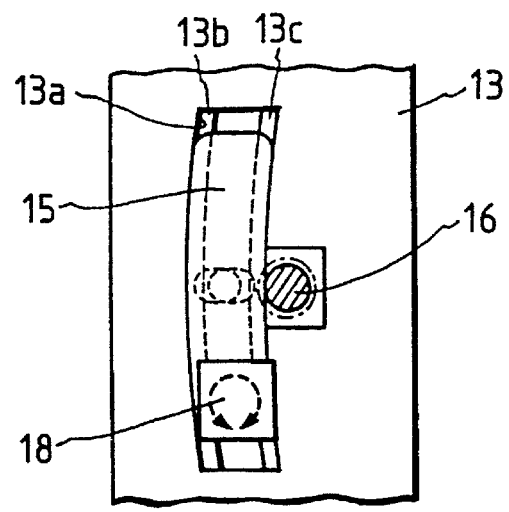
Figure 5:
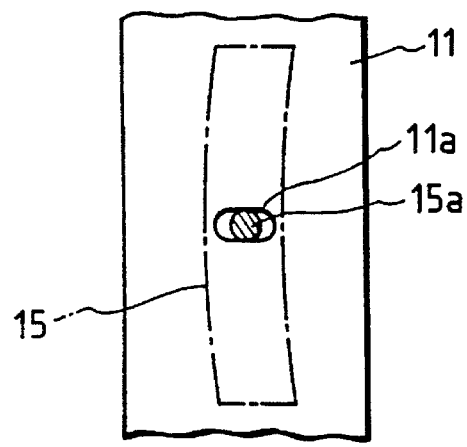

Further, on the inner edge of this Y-driving slider 15, a gear is cut, and a Y-driving pinion gear 16 which engages with this gear is provided to be driven by a Y-driving motor 17 mounted through a motor mount 17a arranged outside the fixed frame 13 as clear from FIG. 3 and FIG. 4.

A reference numeral 18 designates a pitching angle velocimeter (sensor) provided integrally on a part of the Y-driving slider 15 with the cylindrical projection 15a positioned on the locus of the radius R of rotation as described above, which serves as an angular variation detecting means for detecting the rotation having the radius R of rotation of the Y-driving slider 15 as its center. This angular velocimeter 18 is arranged to detect the rotation angle velocity (pitching angle velocity) of an optical apparatus according to the present invention around the axis X. Here, it may be effective to use a known angular velocimeter of a vibrating reed type as the pitching angle velocimeter 18.

A reference number 19 designates an X-driving slider; 20, an X-driving pinion gear; 21, an X-driving motor; and 22, a yawing angle velocimeter. These are of substantially the same structures as the constituents (15 through 18) on the above-mentioned Y axis side. The specific descriptions thereof will therefore be omitted.

Here, on this X axis side, a yawing angle velocimeter 22 comprising a known angular velocimeter of a vibrating reed type or the like is used as the angular variation detecting means, thus making it possible to detect the rotation angle velocity (yawing angle velocity) of an apparatus according to the present invention around the axis Y.

A reference numeral 23 designates a driving control unit for driving the above-mentioned Y axis side and X axis side, which comprises a CPU, a motor power source, and others. In accordance with the outputs from the above-mentioned pitching angle velocimeter 18 and yawing angle velocimeter 22, computations are executed to control the Y-driving motor 17 and X-driving motor 21.

Now, in describing the operation of the apparatus having the above-mentioned structure, the conditions of the optical system are given below.

At first, in FIG. 1 which has been described earlier, the image shifting amount D on the image formation plane corresponding to the shifting amount D' of the image deviation corrective lens 7, which forms the third lens group in the optical apparatus (the entire optical system), can be expressed by the equations given below.

$$D'=D/A$$

$$D=A \times D' \quad (A: \text{proportional constant}) \quad (1)$$

Also, in the image shifting by the angular variation of the optical axis of the optical apparatus (the entire optical system), if a focal length of the entire optical system is given as f, an image deviation amount d at a variation of angle θ of the optical axis can be expressed by the following equation:

$$d = f \times \theta \quad (2)$$

However, an image deviation due to the shift of the principal point of an optical apparatus as a whole is ignored because it is usually smaller than an image deviation amount d due to the optical axis angular variation represented by the above-mentioned equation (2) (when the image formation magnification β<<1).

Therefore, if the corrective optical system (the image deviation corrective lens 7) is driven to satisfy d=−D at all times with respect to the optical apparatus, it is possible to correct an image deviation resulting from the rotation of the optical axis of the optical system. Given a shifting amount of the corrective optical system for correcting this image deviation amount d as D', this shifting amount D' is obtainable by the following equation (3):

$$\begin{aligned} D' &= -(f \times \theta)/A \\ &= -\theta \times (f/A) \end{aligned} \quad (3)$$

For the driving mechanism 10 of the corrective optical system (image deviation corrective lens 7) described in conjunction with FIG. 2 through FIG. 5, the Y-driving slider 15 (the same being applicable to the X-driving slider 19) is schematically represented as in FIG. 6.

In other words, the Y-driving slider 15 is formed in a circular shape as described earlier, and it is rotative with its center Or. The center of the cylindrical projection 15a of the Y-driving slider 15 for driving the corrective optical system frame 11 is positioned at the radius R of the rotation. In the example shown in FIG. 6, the sensitive shaft of the pitching angle velocimeter 18 is also positioned on the locus of the radius R of the rotation.

Now, the value of the radius R of rotation is defined as follows:

$$R = f/A \quad (4)$$

Then, this equation (4) is combined with the equation (3):

$$D' = -\theta \times R \quad (5)$$

The condition of this equation (5) can be satisfied by allowing the Y-driving slider 15 to be rotatively shifted by −θ with respect to the center of rotation Or when the optical axis of the optical apparatus is caused to vary its angle at θ. This means that the angular position with respect to the center of rotation Or is always constant in the spatial coordinate system (inertial system), that is, there is no generation of angular velocity at all eventually. Here, the parallel displacement of the optical apparatus or the center of rotation Or is ignored as described earlier.

Thus, it is possible to achieve the correction of an image deviation resulting from pitching by causing the driving control unit 23 to drive the Y-driving motor 17 for controlling the position of the Y-driving slider 15 in order to eliminate any angular variation output of the pitching angle velocimeter 18 fixed to the Y-driving slider 15 at all times, that is, to cause the output of the pitching angle velocimeter 18 to be made its static output.

Here, strictly speaking, the condition should be D'=sin(−θ)×R, but the shifting amount of the corrective optical system is D'<<R. Accordingly, there is no problem in adopting the above-mentioned equation (5).

Figure 7:
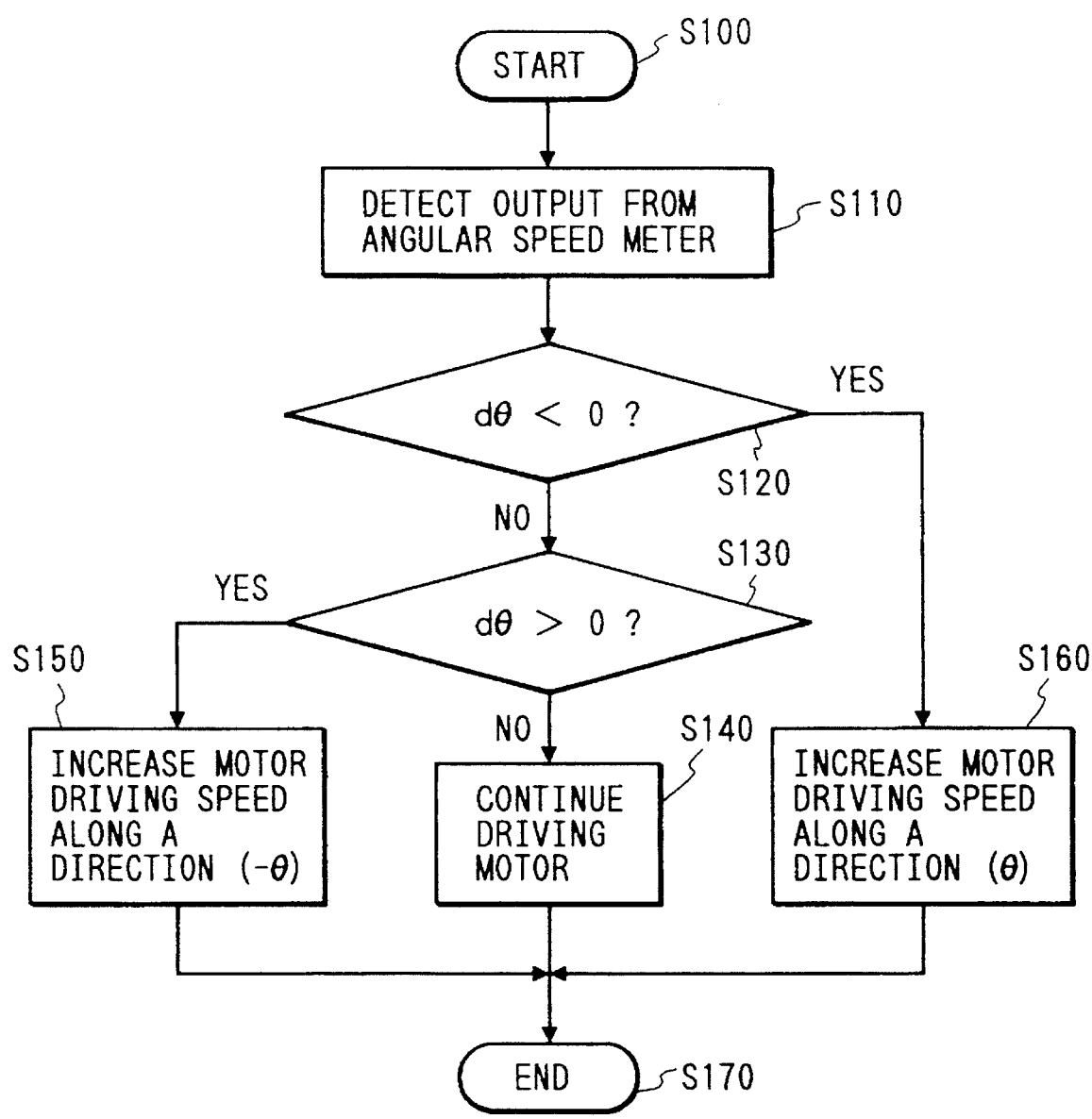
FIG. 7 a flowchart showing an example of the driving control algorithm to be executed by the driving control unit of an image deviation correcting apparatus according to the present invention.

FIG. 7 shows an example of the driving control algorithm to be executed by the above-mentioned driving control unit 23.

At first, the controlling process starts in step (hereinafter referred to as S) 100, and in S110, the output of the pitching angle velocimeter 18 is detected.

Then, in S120, whether an angular velocity (dθ) given to the Y-driving slider 15 is in the minus direction or not is determined according to the output from the pitching angle velocimeter 18. Subsequently, if it is minus, the process proceeds to S160 to increase the driving velocity (to increase the driving voltage) of the Y-driving motor 17 in the direction in which a plus angular velocity should be applied in order to offset the minus angular velocity of the Y-driving slider 15. Also, in the S120, if the angular velocity given to the Y-driving slider 15 is not minus, the process will proceed to S130.

In this S130, whether the angular velocity given to the Y-driving slider 15 is in the plus direction or not is determined according to the output from the pitching angle velocimeter 18 at this time. Then, if it is in the plus direction, the process will proceed to S150 to increase the driving velocity of the Y-driving motor 17 in the direction in which a minus angular velocity should be applied in order to offset the plus angular velocity of the Y-driving slider 15. Also, if the angular velocity given to the Y-driving slider 15 has not been found to be in the plus direction in the S130, the process will proceed to S140.

Thus, when the process proceeds to S140, the angular velocity given to the Y-driving slider 15 is zero. Therefore, the driving of the Y-driving motor 17 is maintained to keep this state as it is. In other words, the control of the driving control unit 23 is left intact on the condition determined in the last routine. If this routine is the initial one and the motor 17 is assumed to be at rest, then this state of suspension is maintained continuously.

Subsequent to the completion of each of the above-mentioned stepping operations in S140, S150, and S160, one routine will be terminated in S170. In this respect, the routine in S100 through S170 is repeated rapidly.

Also, it may be possible to set the degree of the driving intensification of the Y-driving motor 17 in S120 and S130 by the predetermined degrees for each of the intensifications required or to set it so as to be in proportion to the absolute value of a detected angular velocity.

Further, although not shown, it is possible to provide a posture detection switch (a posture detection switch formed by combining mercury switches for detecting the direction in which the posture and gravity of the apparatus are given, for example), and if the driving control unit 23 is allowed to control the power supply to the Y-driving motor 17 in consideration of the effect of the gravity exerted on each of the movable members, then it becomes possible to enable an image correction with a higher precision.

Also, it is preferable to perform the driving control by an application of the fuzzy technology which has thrivingly been in practice in recent years.

In the foregoing a simple example of a driving control algorithm for the driving control unit 23 has been shown, but it is not confined thereto as a matter of course.

It will be appreciated that, the correction of an image deviation resulting from yawing in the X axis direction is exactly the same as the driving control in the Y axis direction. Thus, the description thereof will be omitted.

Also, in the above-mentioned example, the description has been made of a case where an angular velocimeter (sensor) is used as means for detecting angular variations, but it is not limited thereto.

For example, it is possible to employ an angular acceleration sensor such as disclosed in Japanese Patent Laid-Open Application No. 64-1918. In other words, it is sufficient if only the driving of the corrective optical system is controlled so that the Y-driving slider 15 is not caused to present any angular variations with respect to the inertial system at any moment. To this end, it is good enough if only the driving control is given in the direction to restrain the generation of an angular velocity at all times.

Another possible alternative is to employ a sensor comprising two acceleration sensors with matching sensitivity axes (in the direction of a contacting line of the rotation locus of the Y-driving slider 15). In other words, the acceleration sensor is fixed in a forward position and rear position of the optical axis of the Y-driving slider 15 (the position where the radius of rotation becomes large and small), and attention is given to the difference in the outputs from both sensors. Then, if the Y-driving slider 15 has no angular acceleration component, there will be no output. If there is any angular acceleration component, a difference in the outputs is present. Therefore, the difference in the outputs from the both acceleration sensors is detected, and the required driving control is performed in the direction to restrain the generation of such a difference in the outputs.

FIG. 8 through FIG. 12 are views illustrating a second embodiment of an image deviation correcting optical apparatus according to the present invention. In these figures, the constituents corresponding to those appearing in the aforesaid FIG. 2 through FIG. 5 are provided with the same reference numbers, and the detailed descriptions thereof will be omitted.

Figure 8:
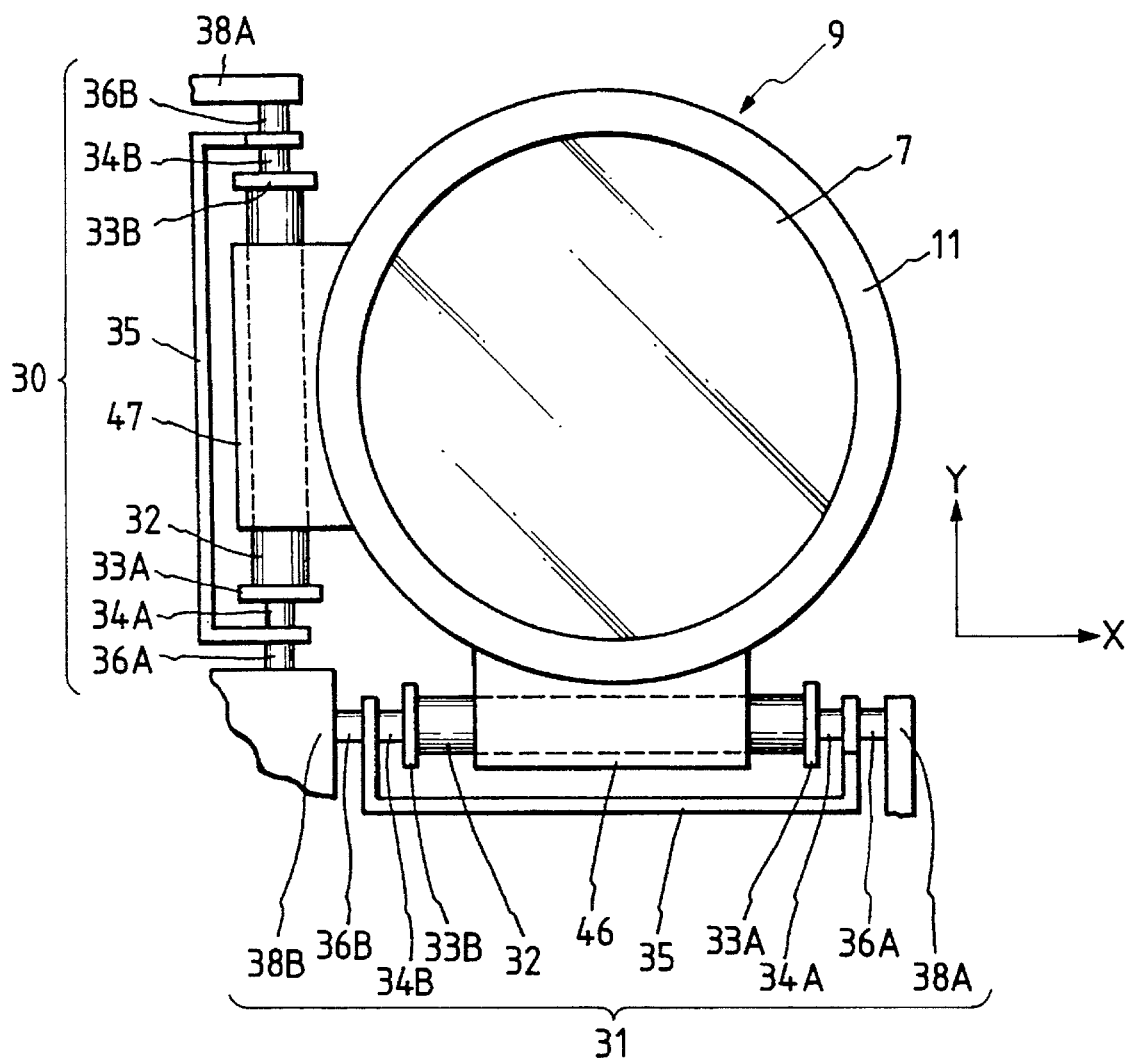
FIG. 8 is a front view illustrating a second embodiment of an image deviation correcting apparatus according to the present invention.

An image deviation correcting optical apparatus in the present embodiment comprises a corrective optical system 9, an X-driving unit 30, Y-driving unit 31, and components as shown in FIG. 8.

For the corrective optical system 9, an X-driving shaft bearing 47 and Y-driving shaft bearing 46 are arranged at positions diaposed at right angles with each other on the outer circumference of a circular frame 11 for a corrective lens, and the corrective lens 7 is mounted in the corrective lens frame 11.

The X-driving unit 30 is a portion whereby to drive the corrective optical system 9 in the X axis direction (horizontal direction in FIG. 8) while the Y-driving unit 31 is a portion whereby to drive the corrective optical system 9 in the Y axis direction (vertical direction in FIG. 8). Here, the X-driving unit 30 and Y-driving unit 31 are substantially of the same structures. Therefore, the description will be made only of the Y-driving unit 31.

The Y-driving shaft 32 is a cylindrical member to support the Y-driving bearing 46 rotatively and slidably in the optical axis direction. Therefore, the corrective optical system 9 can be shifted freely in the rotational and axial directions of the Y-driving shaft 32. At both ends of the Y-driving shaft 32, one end side of the Y-driving shaft supporting member 33 is fixed as shown in FIG. 8 (herein, members which form a set, such as those at 33A and 33B in FIG. 8, are simply designated by the common numeral, such as 33).

Figure 9:
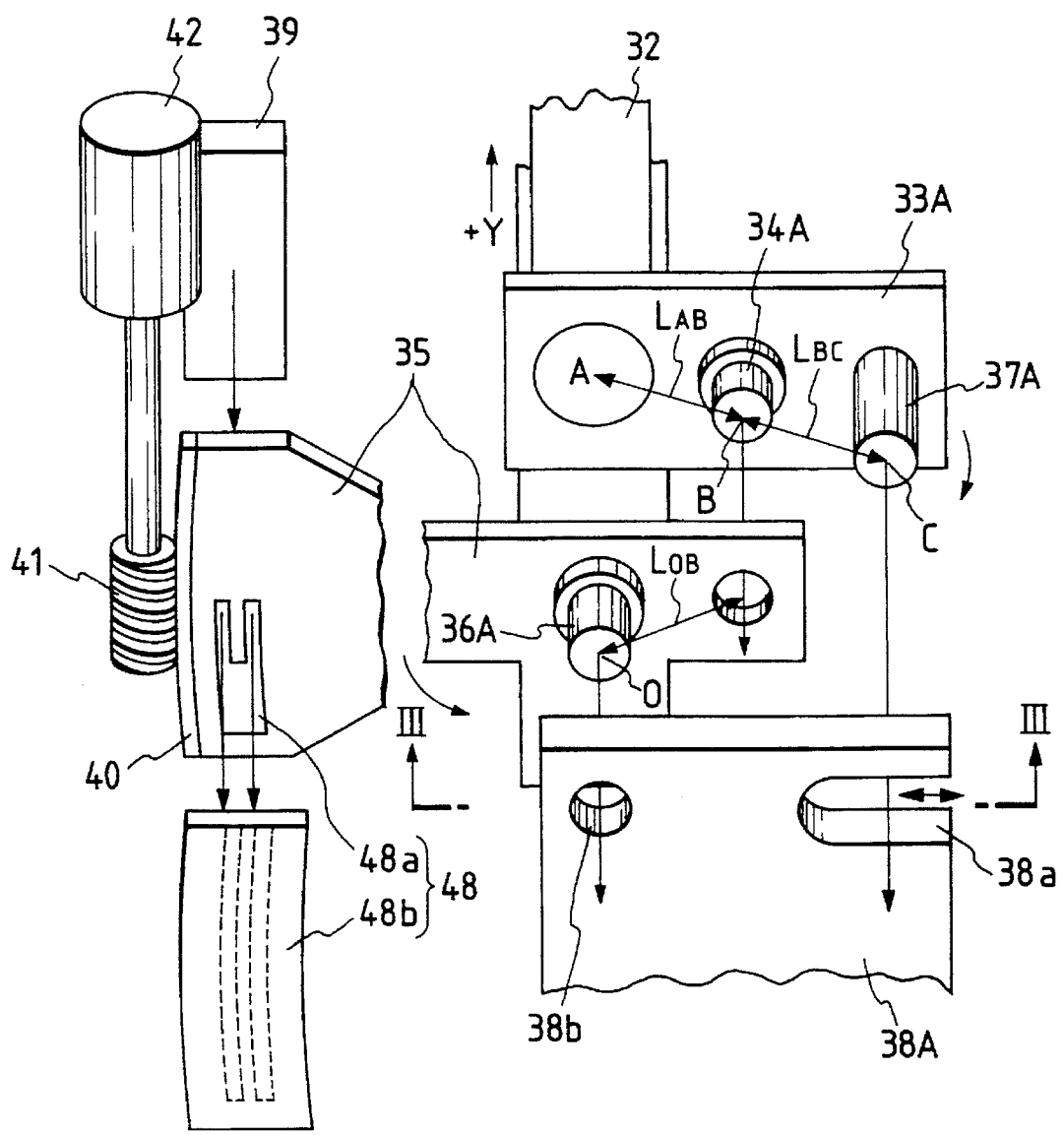
FIG. 9 is a perspective view mainly illustrating the Y-driving unit of the second embodiment.
Figure 10:
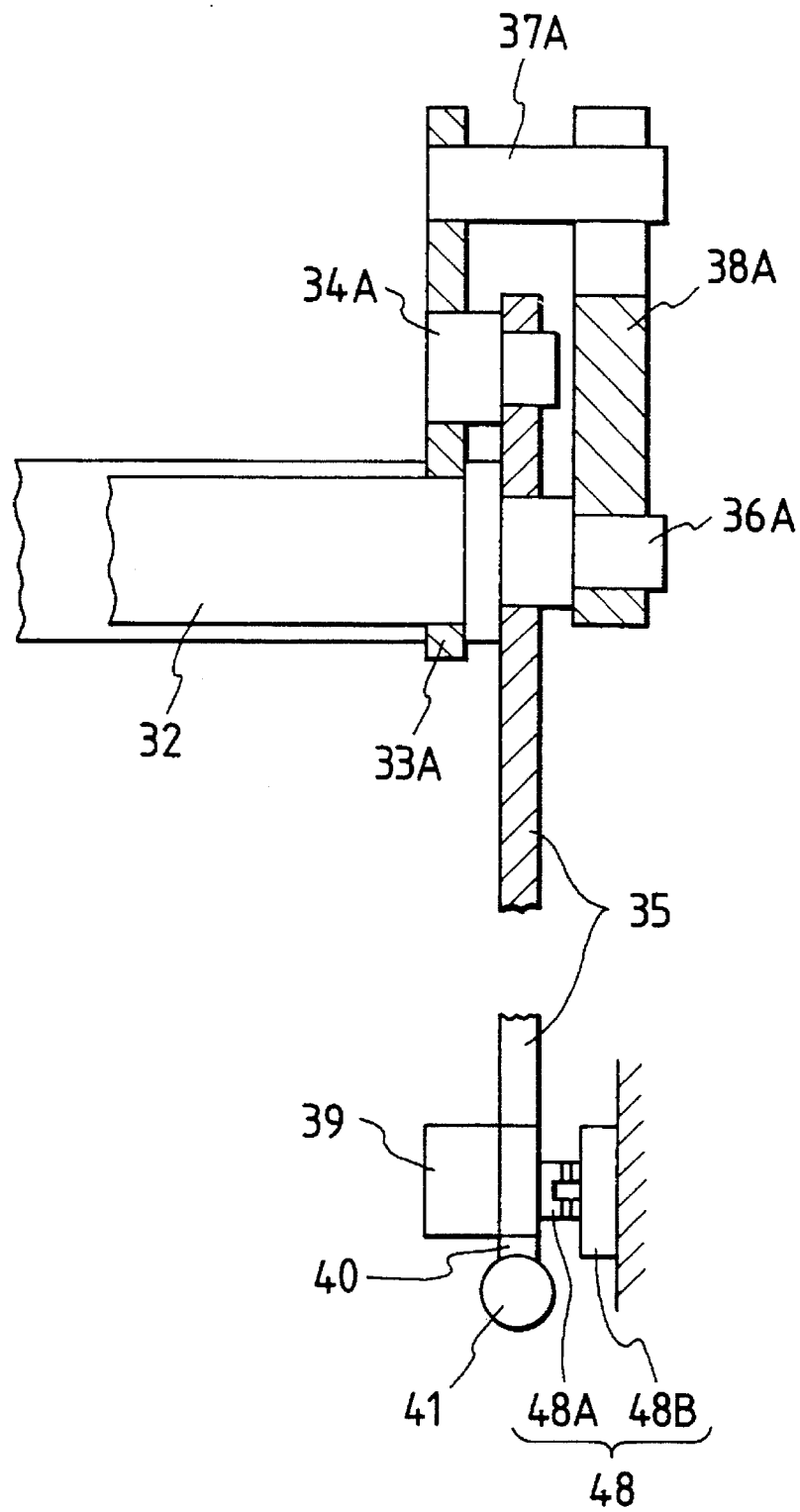
FIG. 10 is a partially cross-sectional view mainly illustrating the Y-driving unit of the second embodiment.

As shown in FIG. 9, a Y-driving B pin 34 is fixed substantially in the center of the Y-driving shaft supporting member 33, and on the Y-driving B pin 34, a Y-driving arm 35 is rotatively mounted. To this Y-driving arm 35, a Y-driving O pin 36 is fixed. On the other hand, a Y-driving C pin 37 is fixed to the other end side of the Y-driving shaft supporting member 33.

The Y-driving unit supporting member 38 is fixed to the photography equipment case equipped with a mechanism according to the present embodiment and others, and in the bearing hole 38b, the Y-driving O pin 36 is rotatively inserted while in the slot 38a formed in the optical axis direction, the Y-driving C pin 37 is slidably inserted. Accordingly, the Y-driving C pin 37 is allowed to slide only in the optical axis direction.

A Y-driving unit balancer 39 is provided on the other end side of the Y-driving arm 35 and is arranged to weight so as to offset the moment around the Y-driving O pin 36 due to the dead weight of the Y-driving unit 31 including the corrective optical system 9.

Now the Y-driving control unit for controlling the driving of the Y-driving unit 31 will be described. It will be appreciated that the X-driving control unit for controlling the driving of the X-driving unit 30 is substantially of the same structure as the Y-driving control unit. Therefore, the description thereof will be omitted. As shown in FIG. 9, a Y-driving worm wheel 40 is fixed to the Y-driving arm 35. A Y-driving worm 41 is arranged to engage the driving worm wheel 40. This Y-driving worm 41 is driven by a Y-driving motor 42. A Y-detecting encoder unit 48 is a portion whereby to detect the deviation angle of the Y-driving worm wheel 40 and specify the shifting position of the corrective optical system 9 in the Y axis direction. Here, the encoder comprises a sliding brush 48a mounted on the Y-driving worm wheel 40 and a resistive pattern printed board 48b mounted on the aforesaid photography equipment case.

Figures 11, 12:
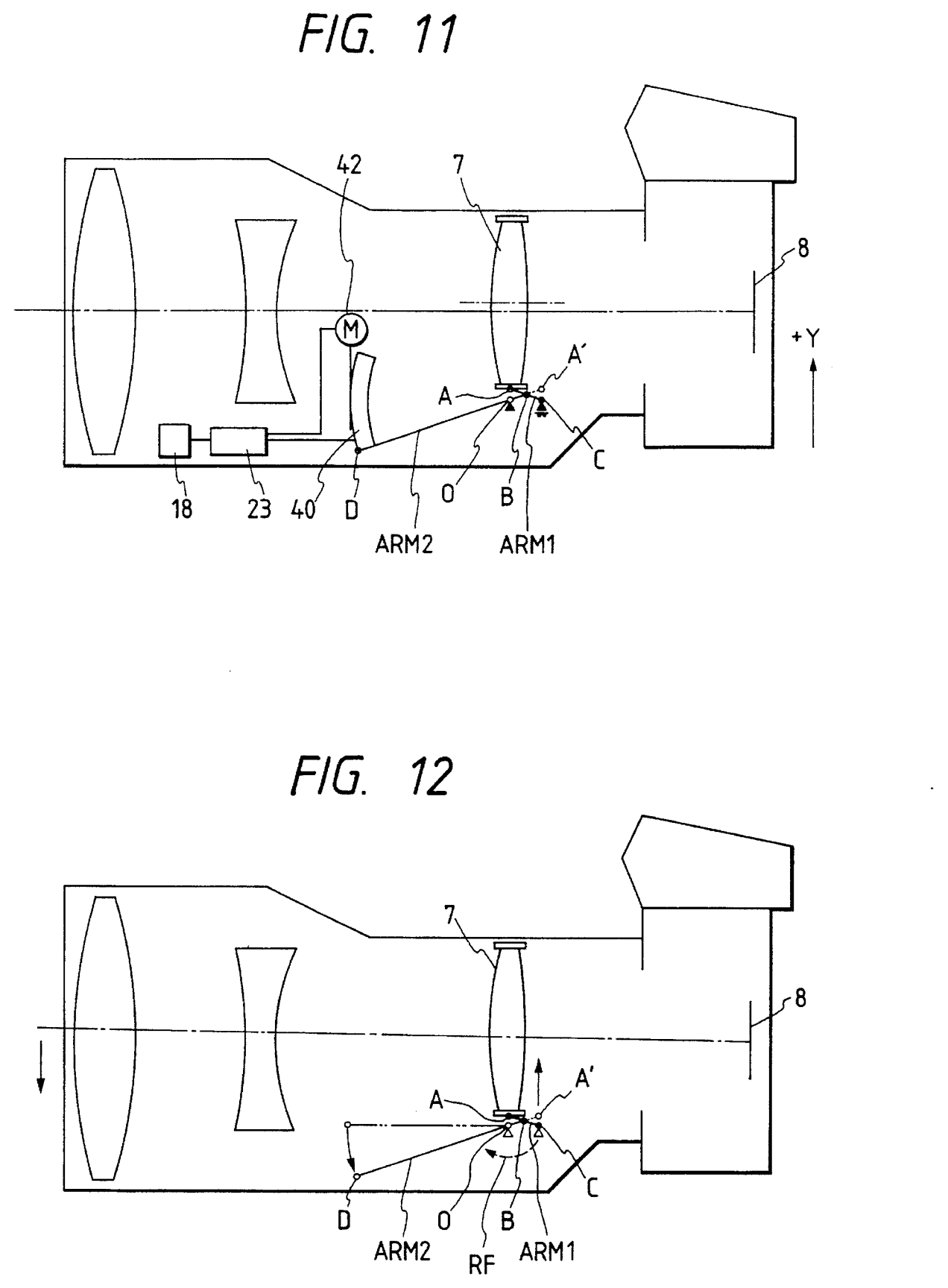

FIG. 11 is a schematic view showing the state that the second embodiment is applied to a telephotographic lens. FIG. 12 is an illustration for describing its operation. In this respect, FIG. 11 represents the parts related to the Y-driving system only. The X-driving system in the direction perpendicular to the plane of FIG. 11 is of the same structure and its representation is therefore omitted.

A driving control circuit 23 receives the signals from the Y-detection encoder 48 described in conjunction with FIG. 9 as well as the pitching angle velocimeter 18 to generate driving signals for the Y-driving motor 42.

Now, the mechanical part of the Y-driving system will be described more in detail. In FIG. 11, a point A is the Y-driving shaft 32; point B, Y-driving B pin 34; point C, Y-driving C pin 37; point O, the center of Y-driving O pin 36. Also, a point D designates the center of gravity of the Y-driving unit balancer 39. Furthermore, the arm ARM1 which connects the points A, B, and C corresponds to the Y-driving shaft supporting member 33, and the arm ARM2 which connects the points B, O, and D corresponds to the Y-driving arm 35.

Now, the distance LAB between the points A and B, the distance LBC between the points B and C, and the distance LOB between the points O and B are set equally. Also, the distance LOD between the points O and D is set considerably longer than the distance LAB between the points A and B. For example, given the distance LAB between the points A and B as LAB=1, the distance LOD between the points O and D can be set as LOD=5 to 10 approximately.

When the corrective optical system 9 is in its neutral position, that is, the case where the optical axis of the corrective optical system and the optical axis of the other optical system are matched, the point A and point O are overlapped at one and the same position in FIG. 11. The arm ARM1 and arm ARM2 are in parallel with the optical axis.

Also, the entire length of the arm ARM2 can be shortened in order to reduce the moment of inertia around the point O of the corrective optical system 9 which is comparatively heavy. In this respect, the moment of inertia around the point O of the corrective optical system 9 is equivalent in such a case that the corrective optical system 9 is positioned at a point A' in FIG. 11.

The distance LOD between the points O and D is set to be considerably long as compared with the distance LAB between the points A and B. Thus, in order to offset the moment due to the dead weight of the corrective optical system 9 around the point O, the weight of the Y-driving unit balancer 39 can be made considerably light as compared with the weight of the corrective optical system 9. For example, according to the example shown in FIG. 11, the distance LA'0 between the points A' and O=2, the distance LOD between the points O and D=10. Consequently, if the weight of the arm is ignored, the weight of the Y-driving unit balancer 39 can be as small as 1/5 of the weight of the corrective optical system 9.

In the present embodiment, driving is possible both in the Y direction and X direction, and the two balancers should be provided each for one direction. However, the weight of the balancers is just 2/5 of the weight of the corrective optical system 9, thus enabling excellent portability and operability.

In conjunction mainly with FIG. 11 and FIG. 12, the description will be made of the operation in a case where a corrective optical system driving apparatus of the present embodiment is equipped with a telephotographic lens thereby to provide a preventive function against unsteady motions given by hands. Referring to FIG. 12, let it be assumed that the leading end of the lens barrel has begun deviating downward relatively as indicated by an arrow when a picture is taken by a camera held manually.

The angular velocity generated by the deviation is detected by the pitching angle velocimeter 18, and the output thereof is transmitted to the driving control circuit 23. The pitching driving control circuit 23 executes an integration process for the output from the pitching angle velocimeter 18 to obtain the angular displacement amount of the phototaking optical axis due to the deviation and generates driving signals for the driving motor 42.

When the driving motor 42 is driven by the driving signal, the Y-driving worm 41 is caused to rotate as shown in FIG. 9 to shift the Y-driving worm wheel 40 downwardly in FIG. 9. As a result, the arm ARM2 (Y-driving supporting member 35) is caused to rotate anticlockwise with the point O (Y-driving O pin 36) as its center. Thus, the arm ARM2 enables the arm ARM1 (Y-driving supporting member 33) to be rotated clockwise through the point B (Y-driving B pin 34) thereby to shift the Y-driving shaft 32 and corrective optical system 9 in the direction +Y. FIG. 11 illustrates the state that the corrective optical system 9 has been shifted in the direction +Y.

At this juncture, the point C (Y-driving C pin 37) is allowed to slide only in the optical axis direction. Thus, the point A (Y-driving shaft 32) is allowed to shift only in one plane perpendicular to the optical axis. Consequently, the corrective optical system 9 is not oscillated in the optical axis direction when it is shifted in the direction perpendicular to the optical axis.

Also, as described in conjunction with FIG. 8, each of the driving shafts (X and Y) and each of the driving shaft bearings (X and Y) can be shifted freely with respect to the axial direction and rotational direction. For example, the corrective optical system 9 is slidable along the X-driving shaft in a case of an Y-driving. In this case, there is no effect to be produced on the driving in the Y direction irrespective of the positions of the X-driving shaft. Hence it is possible to perform driving controls both in the X and Y directions completely independently. Also, each driving shaft is a straight integral member and has a highly rigid holding capability in the corrective optical system 9, thus making it possible to prevent the occurrence of the tilt of the optical axis which may produce an adverse effect on the optical performance.

When the corrective optical system 9 is shifted, its positional information is detected by the Y-detection encoder unit 48 provided for the Y-driving arm 35, and the system is further shifted while detected information is being fed back to the driving control circuit 23 to stabilize the image on the photographic film 8.

At this juncture, a rotational angle acceleration is given to the inertial mass (the driving unit and corrective optical system) in the anticlockwise direction with the point O (Y-driving O pin 36) as its center. Thus, to the case (lens barrel), a rotational reaction in the clockwise direction, which is the opposite direction, is given. In this state, an angular acceleration is being given to the lens barrel in the anticlockwise direction, and the rotational reaction RF in the clockwise direction, which is generated by the driving of the corrective optical system 9, function in the direction to offset the generation of an angular acceleration in the anticlockwise direction. Thus, it becomes possible to block the deviation of the lens barrel to be generated when a picture is taken by a hand-held camera.

The reason why an operation of the present kind is possible is that as shown in FIG. 9 and FIG. 11, the Y-driving unit balancer 39 is arranged further forward in the leading end side of the lens barrel than the corrective optical system 9 and Y-driving O pin 36, and that the Y-driving unit balanar 39 is arranged to rotate in the rotational direction of the lens optical axis. If, on the contrary, this structural arrangement should be transposed to position the Y-driving unit balancer 39 more toward the trailing end side of the lens barrel than the corrective optical system 9 and Y-driving O pin 36, the reaction generated by the driving of the corrective optical system 9 would work in the direction to intensify the deviation of the lens barrel.

Also, when the corrective optical system 9 has begun shifting, the Y-driving unit balancer 39 is caused to rotates downward around the point O (Y-driving O pin 36).

In other words, the corrective optical system and Y-driving unit balancer 39 are statically balanced with the Y-driving O pin 36 as a center, and the driving characteristic of the driving motor 42 is determined only by the inertial amount by the driving mechanism according to the present invention. There is no influence of gravity. Thus the control characteristics of driving of this driving mechanism are not caused to change irrespective of the postures with which it is used. Therefore, it becomes possible to perform highly precise control with a comparatively simple circuit.

Also, as compared with the shifting amount of the corrective optical system 9, the function of the Y-detection encoder unit 48 mounted in the vicinity of the Y-driving unit balancer 39 is enlarged because of the above-mentioned arm length relationship (arm ARM1:arm ARM2). As a result, it is possible to obtain precise information of the shifting amount of the corrective optical system 9 even if a simple encoder of a low resolution is employed as the Y-detection encoder unit 48.

Although Y-driving unit balancer 39 is provided in the present embodiment, depending on the weight distributions of the mechanical members, it may be possible to provide a static balance with the Y-driving O pin 36 as its center. For example, a material having a large specific gravity could be used for the Y-driving worm wheel 40 for such purpose.

Figure 13:
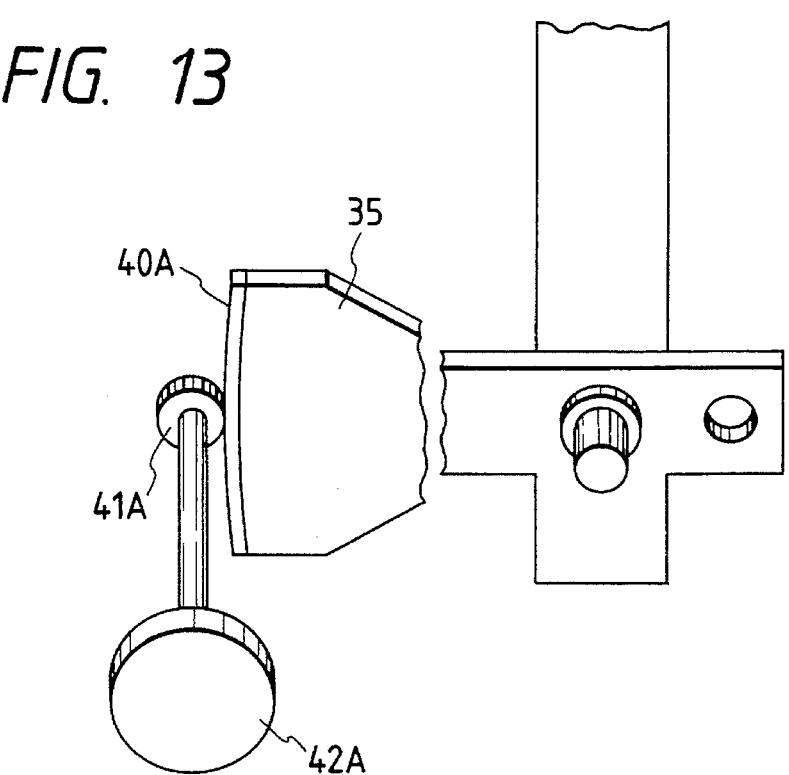
FIG. 13 is a perspective view illustrating a third embodiment of an image deviation correcting apparatus according to the present invention.

FIG. 13 is a perspective view illustrating a third embodiment of the driving control unit for an image deviation correcting optical apparatus according to the present invention. The corrective optical system driving apparatus according to the present invention is such that the Y-driving unit balancer 39 is balanced with the corrective optical system 9 as described above, and that a static balance is maintained irrespective of the posture. Therefore, it is fundamentally unnecessary to provide power required to maintain the corrective optical system at a predetermined position. What is required here is only a little supporting power which can resist the angular velocity variation component of an extremely low frequency to which the Y-driving control circuit 23 does not respond.

Accordingly, it may be possible to use a spur gear 40A instead of the Y-driving worm wheel 40, a pinion gear 41A instead of the Y-driving worm 41, and a stepping motor 42A which has a detent torque instead of the Y-driving motor 42 as shown in FIG. 13.

In this case, the Y-detection encoder unit 48 is not necessarily required, and it is possible to prevent an accumulated error of the shifting amount information of the corrective optical system 9 by a rotary encoder unit, the nonconformity of the stepping motor driving unit or the like.

In this respect, as means for detecting the shifting amount of the corrective optical system 9, the adoption of the Y-driving encoder unit 48 has been described as an example, but it is possible to obtain shifting amount information of the corrective optical system 9 from the rotational angle of the Y-driving motor 42 by mounting a known rotary encoder unit on the Y-driving motor 42.

Figure 14:
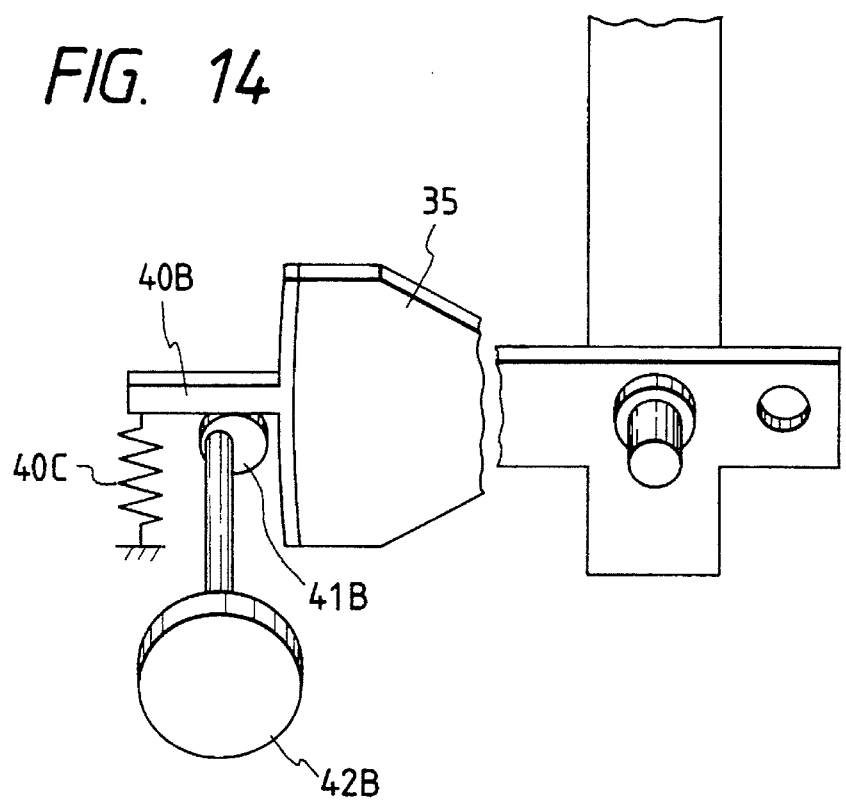
FIG. 14 is a perspective view illustrating a fourth embodiment of an image deviation correcting apparatus according to the present invention.

FIG. 14 is a perspective view illustrating a fourth embodiment of the driving control unit of an image deviation correction optical apparatus according to the present invention. As shown in FIG. 14, it is possible to drive the Y-driving arm 35 by causing a cam follower 40B to be driven following an eccentric cam 42B mounted on the output shaft of the driving motor 42B. Here, a reference numeral 40C designates a cam pressure spring.

Now, according to the second embodiment through fourth embodiment, there is no occurrence of the deviation of the corrective optical system in the optical axis direction (cosine error) due to the driving of the mechanism, hence eliminating the displacement of a focal position in the optical axis direction.

Also, the balance of the entire system in a static state can be maintained with an extremely light balancing member as compared with the corrective optical system, hence improving the portability and operability of the lens barrel.

Furthermore, with the effective arrangement of such a balancing member, it is possible to block the deviation of the lens barrel due to manual holding by driving the corrective optical system.

Moreover, the system is compact as a whole and is highly rigid, having a strong structure against the tilt of the corrective optical system and the torsion thereof around the optical axis, thus making it possible to prevent the degrading of image quality.

Figure 15:
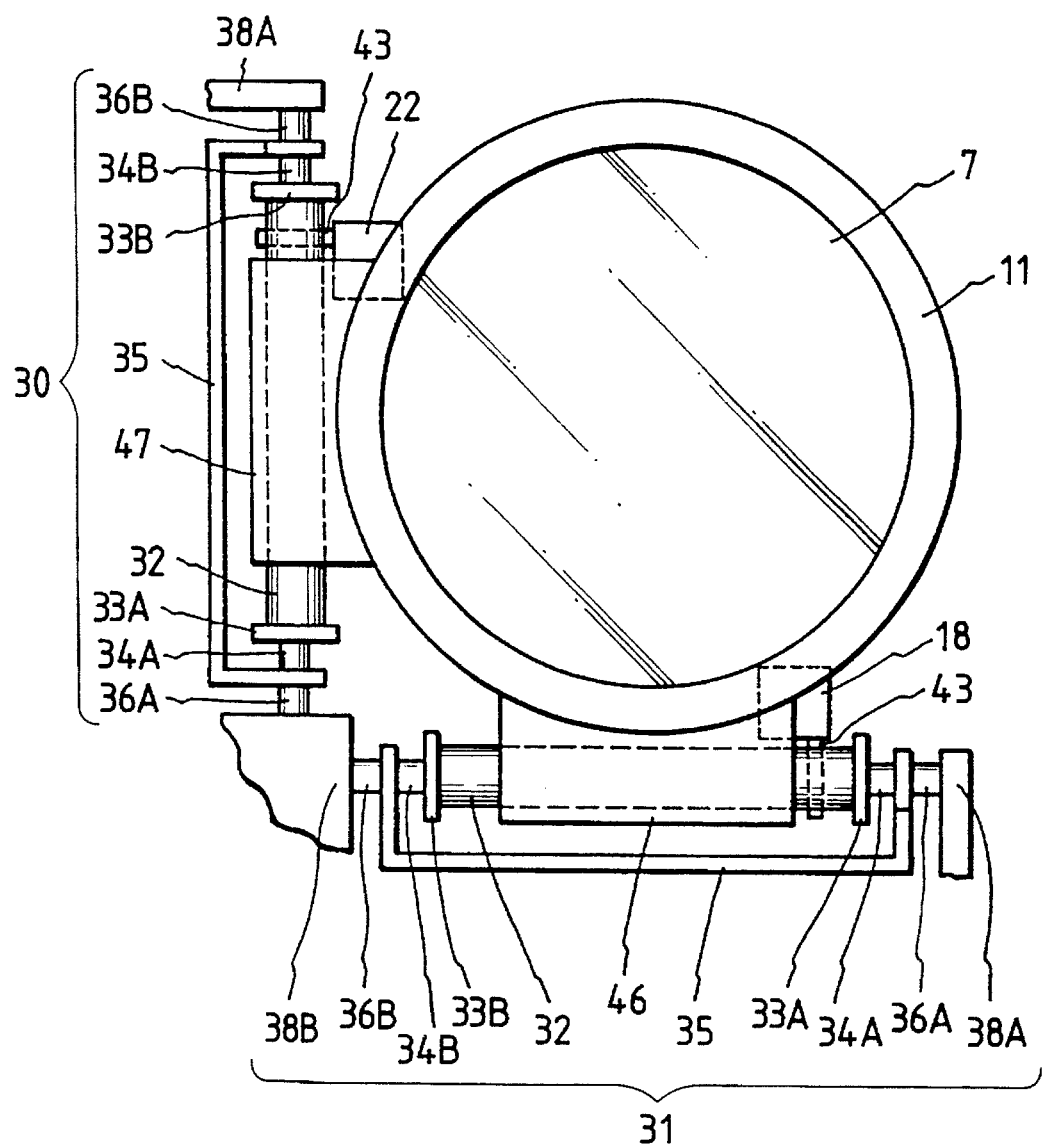
FIG. 15 is a front view illustrating a fifth embodiment of an image deviation correcting apparatus according to the present invention.
Figure 16:
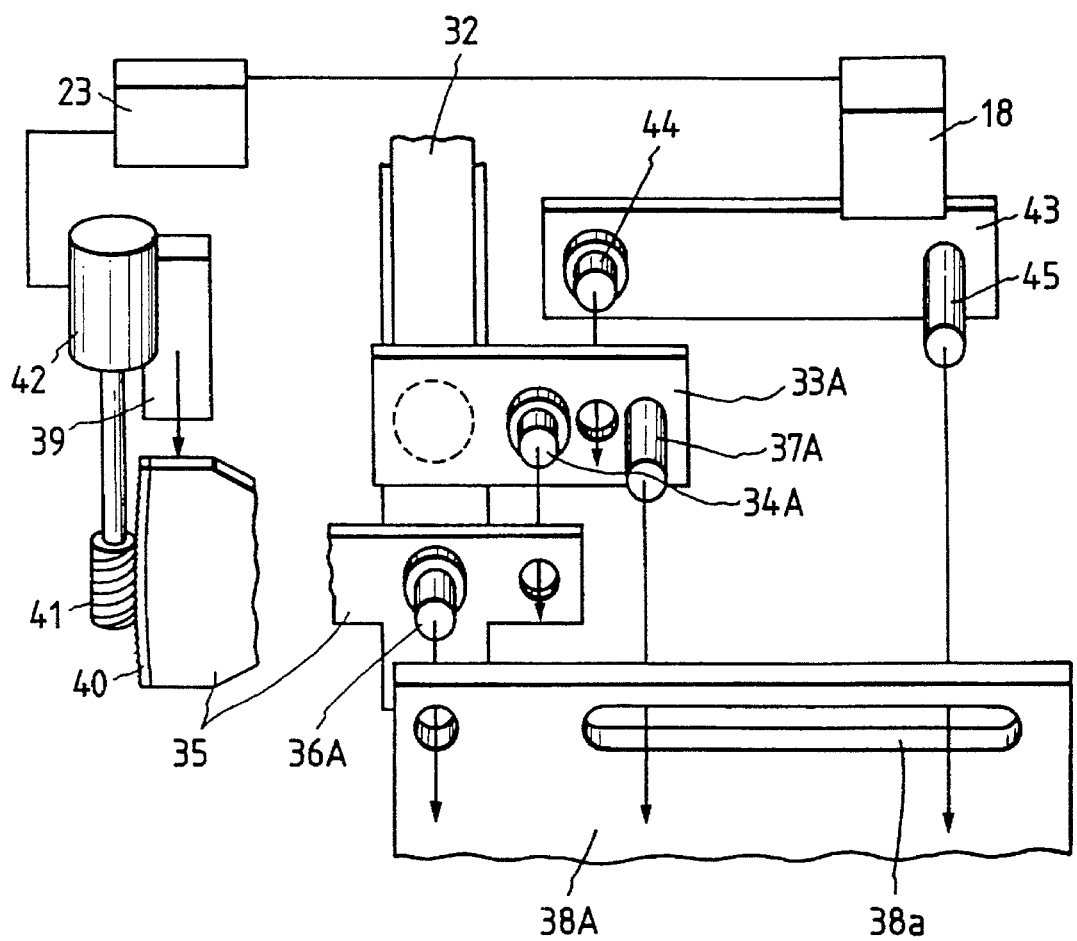
FIG. 16 is a perspective view mainly illustrating the Y-driving unit of the fifth embodiment.
Figure 17:
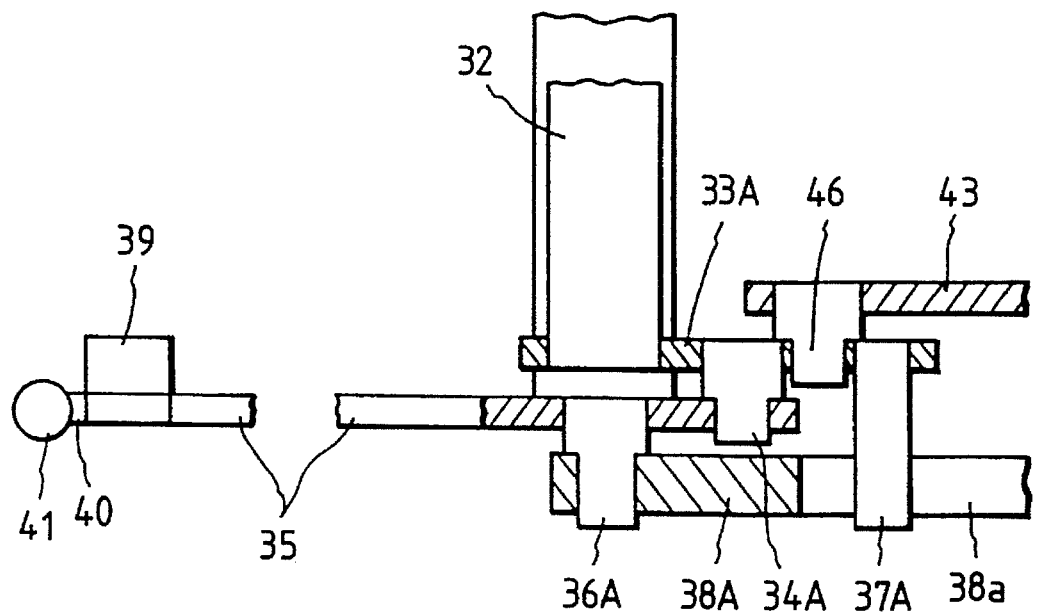
FIG. 17 is a partially cross-sectional view mainly illustrating the Y-driving unit of the fifth embodiment.

FIG. 15 through FIG. 17 illustrate a fifth embodiment of an image deviation correcting optical apparatus according to the present invention, in which the same reference numerals are given to the same or corresponding parts appearing in the aforesaid FIG. 2 through FIG. 5 and FIG. 10 through FIG. 12, and the detailed descriptions thereof will be omitted.

The fifth embodiment is an example in which the pitching angle velocimeter 18 in the aforesaid second embodiment is incorporated in the Y-driving unit 31.

A reference numeral 43 designates the Y-detection arm to which the pitching angle velocimeter 18 is fixed; 44, an F pin fixed to the end portion of the Y-detection arm 43 and rotatively fitted into a hole on the Y-driving shaft supporting member 33; and 45, a G pin fixed to the end portion of the Y-detection arm 43.

Also, in the Y-driving unit supporting member 38, a slot 38a is provided in the optical axis direction as clear from FIG. 16, and the Y-driving C pin 37 and G pin 45 are fitted thereinto. Then, with a structure such as this, the Y-driving C pin 37 and G pin 45 are allowed to slide only in the optical axis direction.

Figure 18:
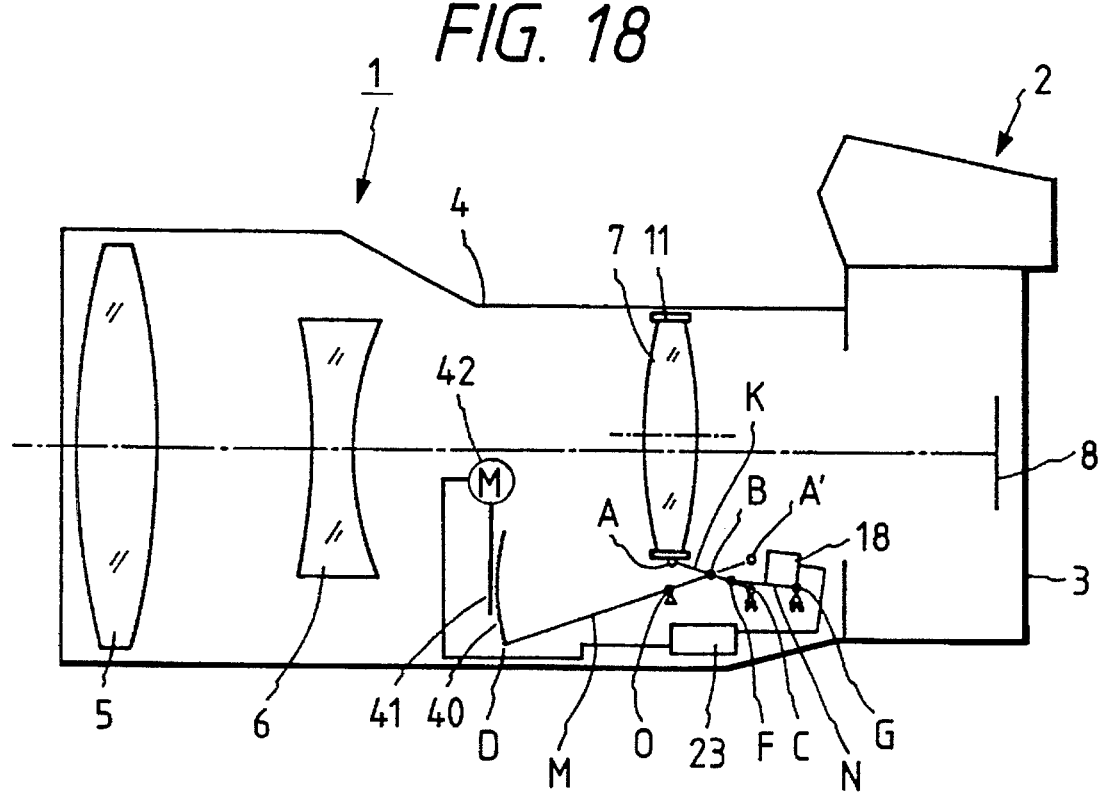
FIG. 18 is a schematic view showing a state of the fifth embodiment being mounted for a telephotographic lens.
Figure 19:
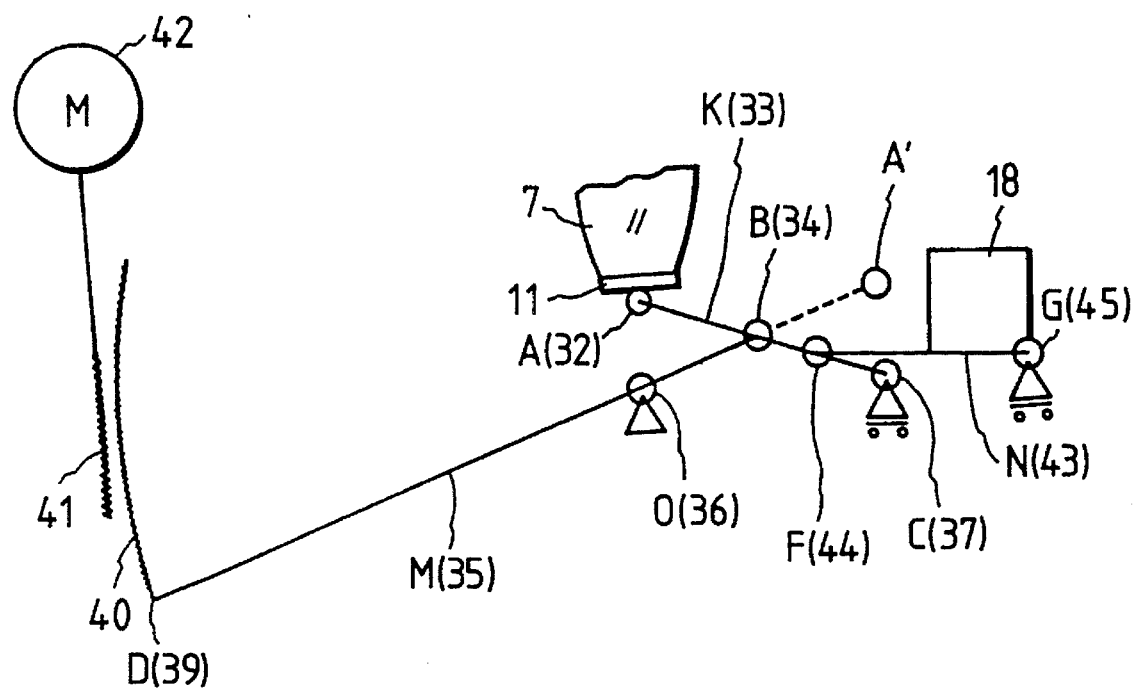
FIG. 19 is an enlargement schematically showing a principal portion of FIG. 18.

FIG. 18 and FIG. 19 are schematic views representing the fifth embodiment shown in FIG. 15 through FIG. 17, in which the same reference marks are given to the same parts appearing in the aforesaid FIG. 1. Here, in FIG. 18 and FIG. 19, the portion related to the Y-driving system is represented, but the X-driving system perpendicular to the plane of the figures, which is not shown, is of the same structure and the specific representation and description thereof will be omitted.

In FIG. 18 and FIG. 19, the point A designates the Y-driving shaft 32; the point B, Y-driving B pin 34; point C, Y-driving C pin 37; point O, Y-driving O pin 36; point F, the F pin 44 of the Y-driving detection arm 43; and point G, G pin 45. Further, the point D designates the balancer 39 for the Y-driving unit.

Also, the arm K connecting the points A, B, and C corresponds to the Y-driving shaft supporting member 33; arm M connecting the points B, O, and D, Y-driving arm 35; arm N connecting the points F and G, Y-detection arm 43. Further the point F is positioned between the points B and C on the arm K.

Here, the distance between the points A and B, distance between the points B and C, and distance between the points O and B are set equally.

Also, the distance between the points O and D is set considerably long as compared with the distance between the points A and B. For example, given the distance between the points A and B as 1, the distance between the points O and D should be set as 10.

Furthermore, in the neutral state of the corrective lens 7 constituting the corrective optical system (the state where the optical axis of the corrective optical system and the optical axis of the other optical system are matched), the points A and O are overlapped at one and the same position, and the arm K and arm M are in parallel with the optical axis.

FIG. 18 and FIG. 19 represent the state that the corrective optical system (corrective lens 7) has been driven in the direction +Y by a shifting stroke D'.

In structure described above, when the arm M is rotated around the point O in the anticlockwise rotation, the arm M causes the arm K to rotate in the clockwise rotation through the point B to shift the corrective optical system (image deviation corrective lens 7) in the direction +Y. At this juncture, the point C is allowed to slide only in the optical axis direction, thus causing the point A to be shifted in the plane perpendicular to the optical axis.

In this respect, an arm construction of the kind forms a so-called Scott-Russel mechanism, the details of which are well known.

Here, let it be assumed that the distance between the points A and C is given as L1, the distance between the points C and F, as L2, and the length of the arm N (distance between the points F and G), as L3. Also, the shifting stroke of the corrective optical system (corrective lens 7) is D'. Therefore, an inclination angle φ of the arm K with respect to the optical axis of the optical apparatus is expressed as in the equation given below.

$$D'=L1\times\phi \quad (6)$$

Here, the inclination angle η of the arm N with respect to the optical axis of the optical apparatus is given in the following equation:

$$L2\times\phi=L3\times\eta \quad (7)$$

Then, these equations (6) and (7) are synthesized:

$$D'=L1\times L3\times\eta/L2 \quad (8)$$

Now, given the focal length of the entire optical apparatus as f and an image deviation amount d at the optical axis variation angle θ as (d=f×θ) as described regarding the aforesaid equations (1) through (3), it is possible to correct an image deviation caused by the rotation of the optical axis of the optical apparatus if only the corrective optical system (corrective lens 7) is driven to satisfy the equation given below at all times with respect to the optical apparatus.

$$d=-D(D=A\times D')$$

Now, $$L1\times L3\times\eta/L2=-(f\times\theta)/A \quad (9)$$

Here, if a condition whereby to satisfy η=−θ considered, the following equation is obtainable:

$$L1\times L3/L2=f/A \quad (10)$$

Then, if L1, L2, and L3 satisfy the condition of this equation (10), it definitely means that the angular position of the arm N (=Y-detection arm 43) with respect to the center point G of rotation in the spatial coordinate system (inertial system) is constant when the optical axis of the optical apparatus is varied at an angle θ as referred to in the description of the aforesaid equation (5). In this respect, the parallel shift of the point G is ignored as described earlier.

Therefore, if L1, L2, and L3 are defined so that the above-mentioned equation (10) can be satisfied, it is possible to achieve the correction of an image deviation due to pitching by operating the driving control unit 23 to cause the Y-driving motor 42 to be driven to control the driving mechanism (Y-driving unit 31) of the fifth embodiment for eliminating the output of the pitching angle velocimeter 18 fixed to the Y-detection arm 43 at all times, that is, enabling the output of the pitching angle velocimeter 18 to be an output in a static state.

For example, if f=300 and A (proportional constant)=1, each of the distances should be defined as L1=8, L2=0.8, and L3=30.

In this respect, both θ and η are small angles as described earlier, and the sine function can be omitted accordingly.

Also, while the control algorithm for the fifth embodiment can be established in the same way as described earlier in conjunction with FIG. 7, it is not confined thereto as a matter of course.

Further, the description has been made of an example in which the point F is positioned between the points B and C on the arm K, but it is possible to position it between the points O and B or O and D on the arm M. Also in the above example, the point F is set rotatively with respect to the arm K while the point G is set rotatively and slidably with respect to the housing of the apparatus (lens barrel 4). However, the structure can be arranged so that the point F is set rotatively and slidably with respect to the arm K (that is, a slit is provided in the longitudinal direction of the arm K so that the F pin 44 can be fitted thereinto) while the point G is rotatively set with respect to the housing of the apparatus (that is, the G pin 45 is received by a hole provided thereon).

Also, as far as the condition that the angular position of the arm N with respect to the center of rotation G in the spatial coordinate system (inertial system) is constant at all times is satisfied, the required mechanism is not necessarily limited to the one mentioned above. For example, even if the point O, point C, and point G are not on one straight line in the formation of its mechanism, there is no problem at all.

Figure 20:
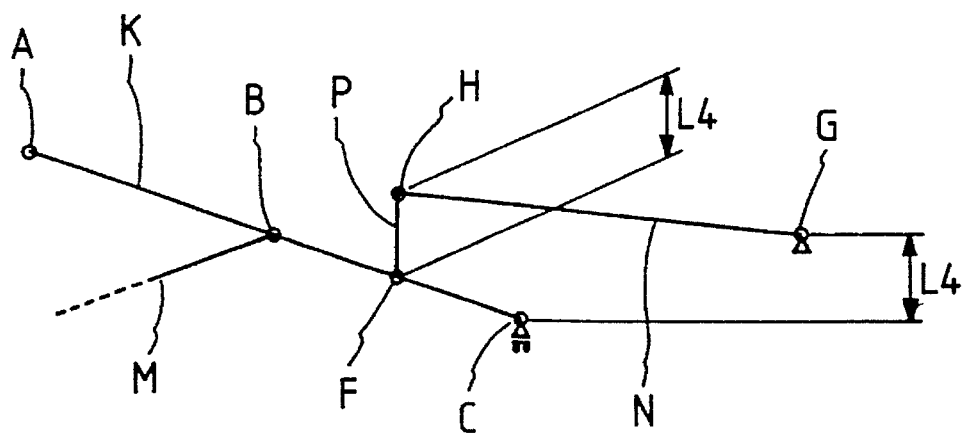
FIG. 20 is a schematic view showing a variation of the fifth embodiment.

Therefore, in an image deviation correcting optical apparatus according to the above-mentioned structure, it is readily understandable that the arm K and arm N at the point F, for example, can be connected through a small arm P as shown in FIG. 20.

Here, the point F and point H at both ends of the arm P are assumed to be rotatively structured.

Also, in such a case, it is desirable to allow the position of the point G to be offset from the extended line of the point O and point C by an amount equivalent to the length of the arm P (L4). Here, it is unnecessary to make the point G slidable.

Further, as referred to in the description of the above-mentioned first embodiment, the angular variation detecting means is not limited to an angular velocimeter (sensor) in the second embodiment through the fifth embodiment.

Figure 21:
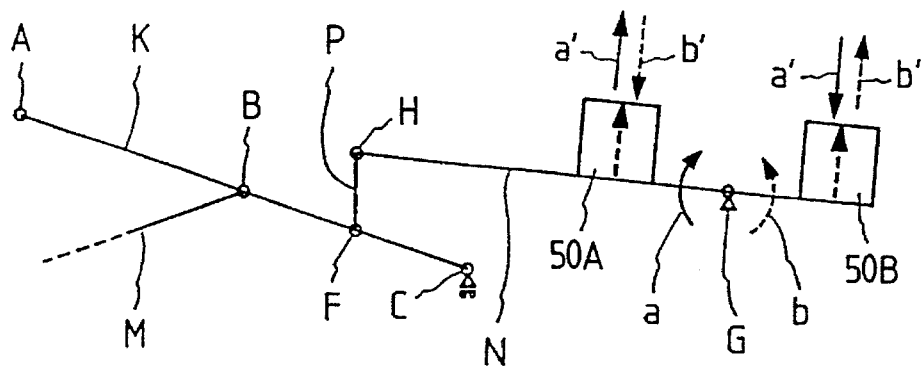
FIG. 21 is a schematic view showing another variation of the fifth embodiment.

For example, as clear from FIG. 21, it is possible to adopt a means formed by combining two acceleration sensors 50A and 50B having its sensitive axes (indicated by upward arrows in FIG. 21) in the same direction perpendicular to the arm N. In this case, the arm N is extended to the opposite side of the point G while the acceleration sensors 50A and 50B are fixed respectively in the locations front and back of the point G.

In a structure such as this, if attention is given to the difference in the outputs of the acceleration sensors 50A and 50B, no difference is noticed in the outputs when the arm N has no angular acceleration component with respect to the inertial system while the presence of difference is noticed in the outputs when there is an angular acceleration component (the acceleration component is given in the opposite direction of one of the sensitive axes). Accordingly, the driving should be controlled in the direction to block the generation of the output differential after having detected the output differential of the acceleration sensors 50A and 50B.

In this respect, when any angular acceleration is generated as indicated by the solid arrow a in FIG. 21, an acceleration indicated by a solid arrow a' occurs in each of the acceleration sensors 50A and 50B, and also, if any acceleration indicated by a broken arrow b is generated, an acceleration indicated by a broken arrow b' occurs in each of the acceleration sensors 50A and 50B.

Also, there is no problem even if the entire length of the arm K is made comparatively short (because of the straight line motion of the point A) in the mechanism of the above-mentioned fifth embodiment. Therefore, it is possible to keep down the inertial moment of the corrective optical system (corrective lens 7) around the point O.

In this respect, the inertial moment of the corrective optical system (corrective lens 7) around the point O is equivalent to the inertial moment of the case where the corrective optical system (corrective lens 7) is positioned at the point A' in FIG. 18 and FIG. 19.

Also, in an example shown in FIG. 11 and FIG. 12, the weight of the two balancers 39 for the Y-driving unit can be as small as ⅔ of the weight of the corrective optical system 9 as referred to in the description of the second embodiment, hence providing the system with excellent portability and operability.

As described above, the static balance centering the Y-driving O pin 36 of the mechanical member of the present invention is well maintained, so that the driving characteristics of this mechanism are determined only by the inertial amount of the mechanism. There is no influence given by the gravity.

As a result, the driving control characteristics of this mechanism are constant irrespective of the posture, and highly precise control is possible with a comparatively simple circuit structure. This means that an image deviation correction can be implemented by a simple circuit with a higher precision than the first embodiment with the execution of the control algorithm which has been described in conjunction with FIG. 7.

Also, because the static balance is maintained irrespective of the postures as set forth above, there is no problem whether the corrective optical system 9 is driven by a roller drive or by a belt drive as a matter of course.

Figure 22:
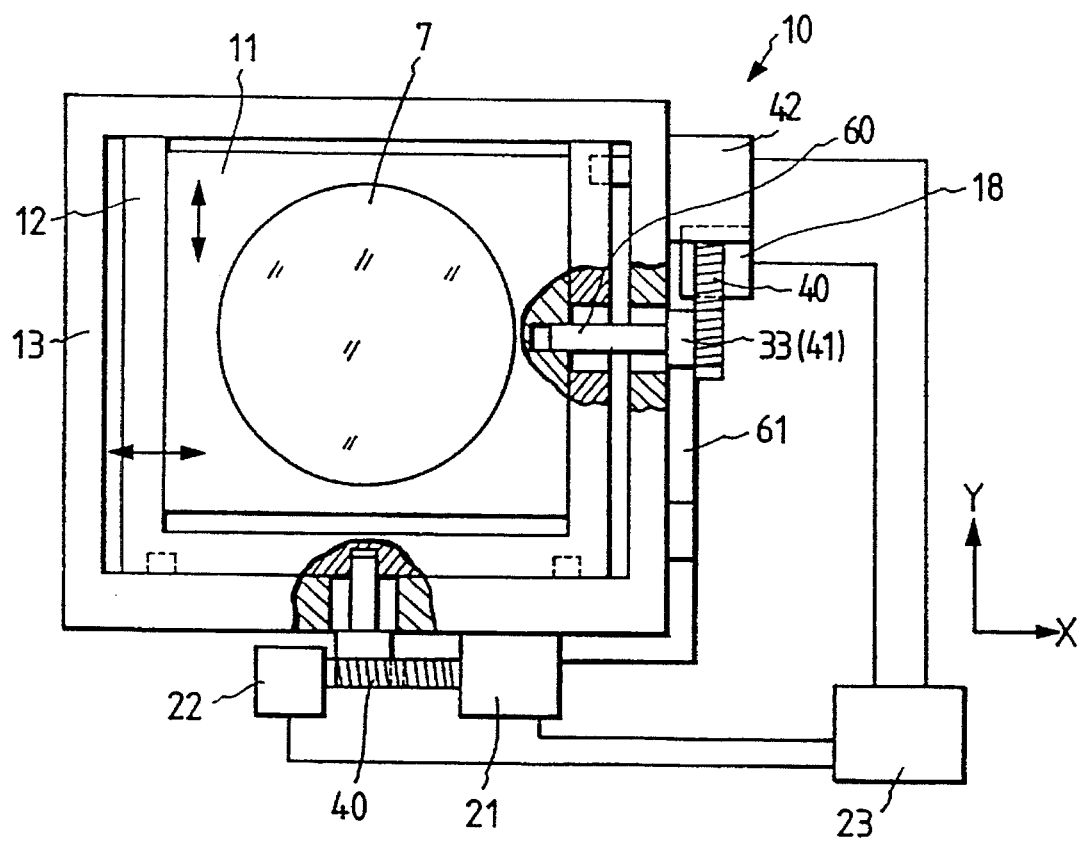
FIG. 22 is a front view illustrating a sixth embodiment of an image deviation correcting apparatus according to the present invention.
Figure 23:
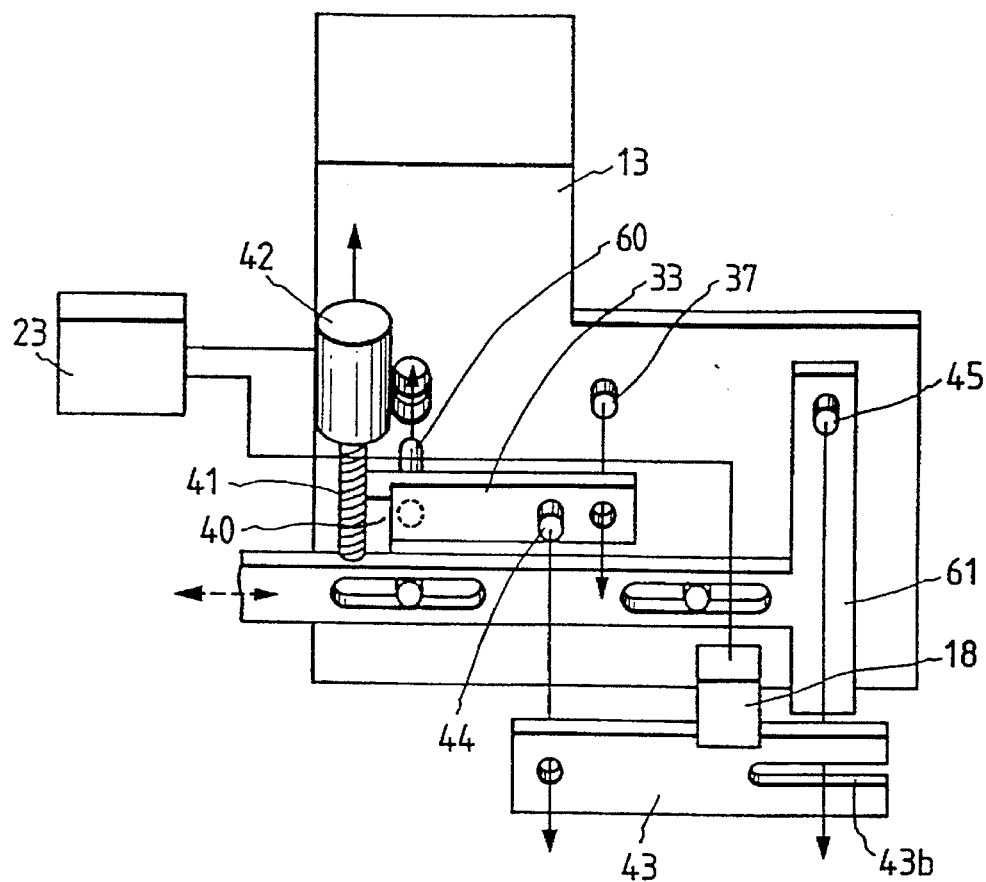
FIG. 23 is a partially cross-sectional view mainly illustrating the Y-driving unit of the sixth embodiment.
Figure 24:
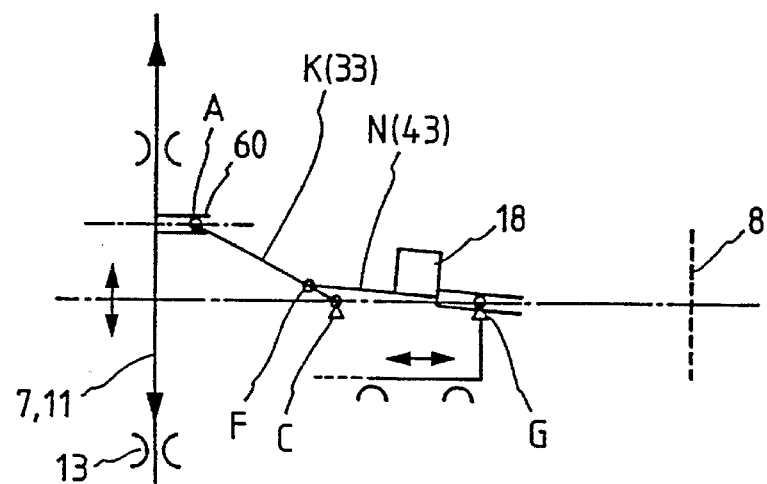
FIG. 24 is an enlargement schematically showing a principal part of the sixth embodiment.

FIG. 22 through FIG. 24 illustrate a sixth embodiment of an apparatus according to the present invention. Here, FIG. 22 is a view in the optical axis direction observed from its front. FIG. 23 is a view of a driving mechanism 10 in the pitching direction (Y-driving direction) observed from the direction perpendicular to the optical axis (from the upper left-hand side in FIG. 22). The driving mechanism in the yawing direction (X-driving direction) is substantially of the same structure with the exception of the motor which is arranged in the opposite direction, and specific representation thereof is omitted. Also, FIG. 24 is a further view schematically showing the pitching direction (Y-driving direction) mechanism only.

This sixth embodiment is effectively applicable to the case where the focal length f of an optical apparatus as a whole is variable. More specifically, it is effectively applicable to a zoom lens and an internal focusing lens.

In the sixth embodiment, the driving mechanism 10 for a corrective optical system is structured by combining the corrective optical system (corrective lens 7), corrective optical system frame 11, X-stage 12, fixed frame 13 of the aforesaid first embodiment and the arm K (Y-driving shaft supporting member 33) and arm N (Y-driving detection arm 43) of the aforesaid fifth embodiment.

Then, the pitching angle velocimeter 18 is fixed to the aforesaid arm N (Y-detection arm 43).

Here, in the present embodiment, a pin A (at 60 in FIG. 22) is planted at the point A on the arm K so as to structure the corrective optical system frame 11 to be shifted in the direction Y by the rotation of the arm K around the point C (which is fixed and not slidable) as the cylindrical projection 15a of the Y-driving slider 15 provided for the first embodiment.

Also, the mechanism to rotate the arm K may be structured in such a manner as shown in FIG. 13 that a worm wheel gear 40 is provided for the end face of the extended arm K (33) to be rotated by a motor 42 through a worm gear 41 mounted on its shaft. Of course, it is not limited to this structure, and it may be possible to arrange a structure so that rotational power is given directly to the point C portion.

Further, if the corrective optical system should be driven directly by a linear motor or other direct driving source, there is no problem for the arm K (33) to be a follower member.

Also, as regards the pin G in the present embodiment, the pin G is mounted on the G pin slider 61 which is slidable in the optical axis direction with respect to the apparatus housing.

This pin G slider 61 is extended to the pin G side of the X-driving mechanism, and the pin G for the X-driving mechanism is also mounted thereon. In other words, the positions of both pins G are determined by the forward and backward positions of the G pin slider 61.

Then, the pin G is slidably and rotatively fitted into the slot portion 43b of the arm N (43). The arm N (43) is rotated around the pin G following the rotation of the arm K (33) with an accompanying slight sliding. However, if the rotation angle η of the arm N (43) and the rotation angle φ of the arm K (33) are small, the sliding amount is also small, and there is no problem to consider that the distance from the point F to the point G is always L3 with the fixation at the point G. Usually, the corrective optical system (corrective lens 7) has its stroke to be D'≪L1. Therefore, this condition is met.

As in the case of the second embodiment, when the corrective optical system 7 is in its neutral state, the above-mentioned point A, point F, point C, and point G are positioned on one and the same line, and the arm K (33) and arm N (43) are in parallel with the optical axis.

Here, if the focal length of the optical apparatus (the entire optical system) is of a variable type, the right-hand side of the aforesaid equation (10), L1×L3/L2=f/A, will be changed. Therefore, either one of the L1, L2, and L3 should be changed so that the equation (10) is satisfied all the time.

Also, in the present embodiment, the pin G is slidable by the shifting of the G pin slider 61 in the optical axis direction of the apparatus with respect to the apparatus housing (lens barrel 4). Accordingly, its position is changeable in response to the variation of the focal length of the entire optical apparatus (optical system). For a structure of this kind, a mechanism should be provided so that the G pin slider 61 can be shifted forward and backward by the cam, link, screw, or other mechanism which is interlocked with the operation of a metering ring if a zooming cam ring for a zoom lens or internal focusing lens is employed, for example.

With the above-mentioned structure, it is now assumed that f=300 and A=1 (constant) and L1=8, L2=0.8, and L3=30 while the point G is positioned 29.2 mm away from the point C. Then, for the variation of f=200 by a zooming, the point G should be positioned 19.2 mm away from the point C because L1=8, L2=0.8, and L3=20 (provided A=1 remaining unchanged).

Here, in an internal focusing lens, the focal length becomes short in a close range photography as compared with a long range photography. Consequently, the adjustment set forth above should also be performed.

Of course, when the constant A is varied, L1, L2, or L3 should be adjusted to satisfy the equation (10). In this example, L3 is made variable, but it is clear that there is no problem at all even if either L2 or L1 is made variable.

Also, the description has been made of the structure that the point G is provided slidably with respect to the apparatus housing and is slidably and rotatively fitted into the slot 43b of the arm N (43), but it may be possible to arrange the structure so that the coupling of the G point junction at the arm N (43) is only rotative while a slot is provided slidably on the point F side.

Further, it should be readily understandable that as in this example, the mechanism in which either one of L1, L2, and L3 can be varied may be applicable to the fourth embodiment described in conjunction with FIG. 15 through FIG. 17. A modification may be made in such a manner, for example, that the portion where the slot of the Y-driving unit supporting member 38 provided in the optical axis direction and the pin G 45 are arranged in the fourth embodiment is structured to be of a type described as the sixth embodiment.

Also, as with for an application the aforesaid fourth embodiment, the coupling portion of the arm K and arm N at the point F may be structured with an additional small arm P.

As regards the image correction of the yawing (X-driving unit side), the above-mentioned embodiment is operated exactly in the same way. The control algorithm for the driving control thereof can be the same as described in conjunction with the aforesaid FIG. 7 or may be some other appropriate controlling algorithm as a matter of course.

Moreover, the present invention is not confined to the structures of the above-mentioned embodiments, and the shapes, structures, and the like of the respective parts constituting the image deviation correcting optical apparatus can be modified as a matter of course.

Also, while the descriptions have been made of a still camera in the above-mentioned embodiments, equipment and apparatus to which an image deviation correcting optical apparatus of the present invention is applicable are not limited thereto.

According to the image deviation correcting optical apparatus of the fifth embodiment or the sixth embodiment as described above, there are provided a corrective optical system supported slidably in the plane which is perpendicular to the optical axis for correcting an image deviation, driving means for driving the system, a movable member constituting a part of this driving means or being interlocked therewith to exert a motion accompanying a rotational component at the time of driving, an angle variation detecting means fixed to this movable member for detecting a rotation with respect to the inertial system, and control means for controlling the driving of the driving means, wherein the movable member is driven to make the angle variation −θ with respect to the optical apparatus in response to the shifting amount D' (D'=D/A; A=a coefficient and D=an image shifting amount) for correcting the image deviation amount (d=F·θ) at an optical axis variation angle θ of the optical apparatus (focal length of the entire apparatus=f). Also, the structure is arranged so that this movable member is not rotated at any moment with respect to the inertial system when responding to the shifting amount D' of the corrective optical system, or there is provided an adjustment means which adjusts the amount of motion for the driving amount of the movable member by the driving means of the corrective optical system, hence the structure being arranged to allow this adjustment means to be rotated in response to the shifting amount D' of the corrective optical system for correcting an image deviation in order to make the amount of the motion of the movable member adjustable. As a result, in spite of the simple structure, various excellent effects can be obtained as listed below.

(1) A part of the means for driving the image deviation corrective optical system is not allowed to rotate in response to the shifting amount D' of the corrective optical system with respect to the inertial system. Thus, it is possible to correct an image deviation appropriately by operating the control means to control the driving of the driving means so as to enable the output of the mounted angle variation detecting means to be in the direction toward a static output (in the direction to eliminate the output of any angle variations), and further, as a result of such an operation, there is an advantage that no other means is needed to monitor the driving amount of the corrective optical system.

(2) The angle variation detecting means can be set simply because it is fixed only to one member.

(3) Also, for an optical apparatus in which its focal length varies according to the conditions of use, such as a zoom lens or an internal focusing lens, the above-mentioned control system can be adopted without changes simply by designing its mechanism. Therefore, the control circuit is not complicated.

(4) Moreover, there is an advantage that the correction of an image deviation due to oscillation can be performed appropriately in accordance with the conditions of use by controlling the operation of the driving means in such a manner that the control means for controlling the driving means for the corrective optical system enables the output of the angle variation detecting means to approach a static output or enables the last operating state of the driving means to be maintained when the output of the angle variation detecting means is a static output.

What is claimed is:

1. An image deviation correcting optical apparatus, comprising:

an optical system constituted partially by a corrective optical system for correcting an image deviation;

a movable member coupled to said corrective optical system;

driving means for driving said corrective optical system through said movable member;

means supporting said movable member to provide a corrective motion accompanying a rotational component when said driving means is driven;

angle variation detecting means fixed to said movable member for detecting rotation relative to a predetermined point of origin of an inertial system; and control means responsive to said angle variation detecting means for controlling the driving of said driving means such that said movable member is driven by said driving means to correct an image deviation due to angle variation of an optical axis of the apparatus as a result of the detected rotation;

said supporting means cooperating with said movable member for substantially maintaining a constant angular position of said movable member with respect to said predetermined point of origin.

2. An image deviation correcting optical apparatus according to claim 1, wherein said control means enables a driving speed of said driving means for generating rotation in a direction opposite to the direction of a rotation angle velocity for said movable member to be faster when the output of the angle variation detecting means indicates a rotation angle velocity with respect to said predetermined point of origin.

3. An image deviation correcting optical apparatus according to claim 1, wherein said control means enables a driving speed of said driving means for generating rotation in the direction of a rotation angle velocity for said movable member to be slower when the output of the angle variation detecting means indicates rotation angle velocity with respect to said predetermined point of origin.

4. An image deviation correcting optical apparatus according to claim 1, wherein said movable member is a member which is movable in a circular path.

5. An image deviation correcting optical apparatus according to claim 1, wherein said movable member is a link member.

6. An image deviation correcting optical apparatus according to claim 1, wherein said angle variation detecting means includes an angular velocity detecting sensor.

7. An image deviation correcting optical apparatus according to claim 1, wherein said angle variation detecting means includes an angular acceleration detecting sensor.

8. An image deviation correcting optical apparatus according to claim 1, wherein said angle variation detecting means includes two acceleration detecting sensors having sensitive shafts oriented in the same direction.

9. An image deviation correcting optical apparatus, comprising:

an optical system constituted partially by a corrective optical system for correcting an image deviation;

a movable member coupled to said corrective optical system;

driving means for driving said corrective optical system through said movable member, said movable member being arranged to provide a corrective motion accompanying a rotational component when said driving means is driven;

angle variation detecting means fixed to said movable member for detecting rotation relative to a predetermined point of origin of an inertial system;

control means responsive to said angle variation detecting means for causing said driving means to drive said movable member in order to correct an image deviation due to angle variation of an optical axis of the apparatus as a result of the detected rotation; and adjusting means for adjusting a movement amount of said movable member such that when said movable member is driven to correct said image deviation, said movable member is substantially maintained in a constant angular position with respect to said predetermined point of origin.

10. An image deviation correcting optical apparatus according to claim 9, wherein said control means enables a driving speed of said driving means for generating rotation in direction opposite to the direction of a rotation angle velocity for said movable member to be faster when the output of the angle variation .detecting means indicates a rotation angle velocity with respect to said predetermined point of origin.

11. An image deviation correcting optical apparatus according to claim 9, wherein said control means enables a driving speed of said driving means for generating rotation in the direction of a rotation angle velocity for said movable member to be slower when the output of the angle variation detecting mane indicates a rotation angle velocity with respect to said predetermined point of origin.

12. An image deviation, correcting optical apparatus according to claim 9, wherein said movable member is a member which is movable in a a circular path.

13. An image deviation correcting optical apparatus according to claim 9, wherein said movable member is a link member.

14. An image deviation correcting optical apparatus according to claim 9, wherein said angle variation detecting means is includes an angular velocity detecting sensor.

15. An image deviation correcting optical apparatus according to claim 9, wherein said adjusting means adjusts the amount of movement of said movable member in response to operation of a member for varying the state of the entire optical system of the apparatus.

16. An image deviation correcting optical apparatus according to claim 15, wherein said member for varying the state of the entire optical system is a focusing adjustment member for an internal focusing lens.

17. An image deviation correcting optical apparatus according to claim 15, wherein said member for varying the state of the entire optical system is a zooming adjustment member for a zoom lens.

18. An image deviation correcting optical apparatus, comprising:

an optical system constituted at least partially by a corrective optical system which is movably supported in a plane perpendicular to an optical axis of the apparatus for correcting an image deviation;

a movable member coupled to said corrective optical system;

driving means for driving said corrective optical system through said movable member;

means supporting said movable member to provide a corrective motion accompanying a rotational component when said driving means is driven;

angle variation detecting means fixed to said movable member for detecting rotation relative to a predetermined point of origin of an inertial system; and control means for controlling the driving of said driving means such that said movable member is driven to make an angle variation $-\theta$ with respect to said optical axis in conjunction with a shifting amount $D'\{D'=D/A$ (where A=a coefficient and D=an image shifting amount)$\}$ of the corrective optical system for correcting an image deviation amount d at a variation angle $\theta$ of said optical axis with respect to said predetermined point of origin $\{d=f\cdot\theta$ (where f=focal length of the entire optical system)$\}$;

said supporting means cooperating with said movable member for substantially maintaining a constant angular position of said movable member with respect to said point of origin in conjunction with the movement of said corrective optical system by the shifting amount D'.

19. An image deviation correcting optical apparatus according to claim 18, wherein said control means controls said driving means to cause the output of the angle variation detecting means to approach a static output.

20. An image deviation correcting optical apparatus according to claim 18, wherein said control means operates so that the most recent operating state of said driving means is maintained when the output of the angle variation detecting means is a static output.

21. An image deviation correcting optical apparatus according to claim 18, wherein said movable member is a member which is movable in a circular path.

22. An image deviation correcting optical apparatus according to claim 18, wherein said movable member is a link member.

23. An image deviation correcting optical apparatus according to claim 18, wherein said angle variation detecting means includes an angular velocity detecting sensor.

24. An image deviation correcting optical apparatus according to claim 18, wherein said angle variation detecting means includes an angular acceleration detecting sensor.

25. An image deviation correcting optical apparatus according to claim 18, wherein said angle variation detecting means includes two acceleration detecting sensors having sensitive shafts oriented in the same direction.

26. An image deviation correcting optical apparatus according to claim 18, further including:

adjustment means for adjusting an amount of motion of said movable member with respect to the driving amount of the driving means.

27. An image deviation correcting optical apparatus according to claim 26, wherein said control said means controls driving means to cause the output of the angle variation detecting means to approach a static output.

28. An image deviation correcting optical apparatus according to claim 26, wherein said control means operates so that the most recent operating state of said driving means is maintained when the output of the angle variation detecting means is a static output.

29. An image deviation correcting optical apparatus, comprising:

a corrective optical system for correcting for deviation of the optical axis of a lens barrel;

a driving shaft for driving said corrective optical system;

a driving unit fixing member fixed to said lens barrel, with a first center axis of rotation and the sliding axis of a slider receiving portion of said driving unit fixing member being arranged in parallel with the optical axis of the lens barrel;

a driving arm rotatively supported toward one end thereof at the first center axis of rotation of said driving unit fixing member and having a second center axis of rotation at a position spaced from the first center axis of rotation by a predetermined distance; and a driving shaft supporting member rotatively supported at the second center axis of rotation of said driving arm, with a slider thereof which is slidable along said slider receiving portion and said driving shaft being mounted in alignment with positions on a straight line through the second center axis of rotation and the second center axis of rotation being centrally disposed between said positions at a distance from each position equal to said predetermined distance;

wherein said driving shaft supported by said driving shaft supporting member is structured so as to be shifted perpendicularly with respect to the optical axis of said lens barrel by oscillating said driving arm to shift said slider slidably along said slider receiving portion.

30. An image deviation correcting optical apparatus according to claim 29, further including a balancing member provided at another end side of said driving arm to be balanced with said corrective optical system.

31. An image deviation correcting optical apparatus according to claim 29, wherein the distance from said balancing member to the first center axis of rotation is longer than the distance from the first center axis of rotation to the second center of axis of rotation.

32. An image deviation correcting optical apparatus according to claim 29, wherein said balancing member shifts in a sense opposite to the shifting of said corrective optical system with respect to said first center of axis of rotation.

33. An image deviation correcting optical apparatus according to claim 29, wherein said balancing member is positioned forward in the direction of said optical axis with respect to said first center axis of rotation.

34. An image deviation correcting optical apparatus according to claim 29, further including:

a shifting amount detecting member provided toward another end of said driving arm for enlarging a shifting amount of said driving shaft for detection.

35. An image deviation correcting optical apparatus according to claim 29, wherein said driving shaft, said driving unit fixing member, said driving arm, and said driving shaft supporting member are provided in one pair each, and said pair of driving shafts support said corrective optical system at positions disaposed at right angles in the plane perpendicular to the direction of said optical axis, so that when said one of the driving shafts is driven, said corrective optical system is shifted in the axial direction of said other driving shaft.

36. An image deviation correcting optical apparatus according to claim 35, wherein said pair of driving shafts are integrated straight members respectively.

37. An image deviation correcting optical apparatus according to claim 35, wherein said corrective optical system is rotatively and slidably mounted to both of said driving shafts respectively, and when one of said driving shafts is driven, said other driving shaft functions as a guide for shifting said corrective optical system.

38. An image deviation correcting optical apparatus, comprising:

a corrective optical system for correcting for deviation of the optical axis of a lens barrel;

driving means including

A. a driving shaft for driving said corrective optical system;

B. a driving unit fixing member fixed to said lens barrel, with a first center axis of rotation and the sliding axis of a slider receiving portion of said driving unit fixing member being arranged in parallel with the optical axis of the lens barrel;

C. a driving arm rotatively supported at the first center axis of rotation of said driving unit fixing member, and having a second center axis of rotation at a position spaced from the first center axis of rotation by a predetermined distance;

D. a driving shaft supporting member rotatively supported at the second center axis of rotation of said driving arm, with a slider thereof which is slidable along said slider receiving portion and said driving shaft being mounted in alignment with positions on a straight line through the second center axis of rotation and the second center axis of rotation being centrally disposed between said positions at a distance from each position equal to said predetermined distance; and E. said driving shaft supported by said driving shaft supporting member being driven perpendicularly with respect to the optical axis of said lens barrel by oscillating said driving arm to shift said slider slidably along said slider receiving portion;

angle variation detecting means for detecting angular deviation of the optical axis of the lens barrel; and control means responsive to said angle variation detecting means for controlling the driving of said driving means.

39. An image deviation correcting optical apparatus according to claim 38, wherein said control means controls said driving means to cause the output of said angle variation detecting means to approach a static output.

40. An image deviation correcting optical apparatus according to claim 38, wherein said control means operates to maintain the most recent operating state of said driving means when the output of said angle variation detecting means is a static output.

41. An image deviation correcting optical apparatus according to claim 38, wherein said angle variation detecting means is includes an angular velocity detection sensor.

42. An image deviation correcting optical apparatus according to claim 38, wherein said angle variation detecting means is includes an angular acceleration detection sensor.

43. An image deviation correcting optical apparatus according to claim 38, wherein said angle variation detecting means is includes two acceleration detection sensors having sensitivity shafts oriented in the same direction.

44. An image deviation correcting optical apparatus according to claim 38, further including:

posture detection means for detecting the direction of gravity, and wherein said control means controls the driving of said driving means in consideration of the effects of the gravity to movable portions.

45. An image deviation correcting optical apparatus comprising:

a corrective optical system for correcting for angular deviation of an optical axis of a lens barrel;

a pair of driving members for driving said corrective optical system, said driving members supporting said corrective optical system within a plane perpendicular to said optical axis and respectively along directions perpendicular to each other, said driving members limiting inclination of said corrective optical system with respect to said plane perpendicular to the optical axis, one of said driving members acting to guide said corrective optical system driven by the other driving member; and a movement detection member provided on at least one said driving member, at a position for enlarging a shift amount of said corrective optical system, for detecting the enlarged shift amount.

46. An image deviation correcting optical apparatus, comprising:

an imaging optical system constituted partially by a corrective optical system; and a driving mechanism for shifting said corrective optical system in relation to another optical element of said imaging optical system, said driving mechanism including a rotationally moving member having a radius of rotation (R) and rotationally moving to effect a shift movement (D') of the corrective optical system along a direction perpendicular to an optical axis of said corrective optical system, wherein the following equation is satisfied $$R=f/A$$

where f is a focal distance of the imaging optical system, A is D/D', and D is an image movement amount on an image plane corresponding to the shift amount D' of said corrective optical system.

47. An image deviation correcting optical apparatus according to claim 46, wherein a rotation center of said rotationally moving member is disposed to an image-plane side of said corrective optical system.

48. An image deviation correcting optical apparatus according to claim 46, further comprising a rotation detecting sensor mounted on said rotationally moving member, an actuator for driving said driving mechanism, and a controller for controlling operation of said actuator based on an output from said rotation detecting sensor.

49. An image deviation correcting optical apparatus according to claim 48, wherein said rotation detecting sensor is an angle velocimeter.

50. An image deviation correcting optical apparatus according to claim 49, wherein said controller controls operation of said actuator so that the output of said rotation detecting sensor approaches a static output.

51. An image deviation correcting optical apparatus according to claim 49, wherein said controller controls to continue operation of said actuator when the output of said rotation detecting sensor is a static output.

52. An image deviation correcting optical apparatus according to claim 48, wherein said controller controls operation of said actuator so that the output of said rotation detecting sensor approaches a static output.

53. An image deviation correcting optical apparatus according to claim 48, wherein said controller controls to continue operation of said actuator when the output of said rotation detecting sensor is a static output.

54. An image deviation correcting optical apparatus, comprising:

an imaging optical system constituted partially by a corrective optical system; and a driving mechanism for shifting said corrective optical system in relation to another optical element of said imaging optical system, said driving mechanism including a rotationally moving member for rotationally moving around a rotation center disposed to an image-plane side of said corrective optical system to effect a shift movement of said corrective optical system along a direction perpendicular to an axis of said corrective optical system.

55. An image deviation correcting optical apparatus, comprising:

an imaging optical system constituted partially by a corrective optical system; and a driving mechanism for shifting said corrective optical system in relation to another optical element of said imaging optical system, said driving mechanism including a rotationally moving member for rotationally moving by an angle $(-\theta)$ relative to a predetermined axis to effect a shift movement of said corrective optical system by an amount (D') along a direction perpendicular to an optical axis of said corrective optical system, wherein the following equation is satisfied, $$-\theta=D'\times A/f$$

where f is a focal distance of the imaging optical system, A is D/D', and D is an image movement amount on an image plane corresponding to the shift amount D' of said corrective optical system.

56. An image deviation correcting optical apparatus, comprising:

an imaging optical system constituted partially by a corrective optical system; and a driving mechanism for shifting said corrective optical system in relation to another optical element of said imaging optical system, said driving mechanism including a first member for inclining by an angle $(\phi)$ relative to a predetermined axis to effect a shift movement (D') of said corrective optical system along a direction perpendicular to an optical axis of said corrective optical system, and a second member connected to said first member for inclining by an angle $(\eta)$ relative to said predetermined axis with the inclination of said first member by the angle $(\phi)$, wherein the following equation is satisfied, $$\eta=D'\times A/f$$

wherein f is a focal distance of the imaging optical system, and A is D/D', and D is an image movement amount on an image plane corresponding to the shift amount D' of said corrective optical system.

57. An image deviation correcting optical apparatus according to claim 56, wherein the angle $(\eta)$ is less than the angle $(\phi)$.

58. An image deviation correcting optical apparatus according to claim 56, further comprising a rotation detecting sensor mounted on said second member, an actuator for driving said driving mechanism, and a controller for controlling an operation of said actuator based on an output from said rotation detecting sensor.

59. An image deviation correcting optical apparatus according to claim 58, wherein said rotation detecting sensor is an angle velocimeter.

60. An image deviation correcting optical apparatus according to claim 59, wherein said controller controls the operation of said actuator so that the output of said rotation detecting sensor approaches a static output.

61. An image deviation correcting optical apparatus according to claim 59, wherein said controller controls to continue the operation of said actuator when the output of said rotation detecting sensor is a static output.

62. An image deviation correcting optical apparatus according to claim 58, wherein said controller controls the operation of said actuator so that the output of said rotation detecting sensor approaches a static output.

63. An image deviation correcting optical apparatus according to claim 58, wherein said controller controls to continue the operation of said actuator when the output of said rotation detecting sensor is a static output.

64. An image deviation correcting optical apparatus, comprising:

an optical system constituted partially by a corrective optical system;

a shift amount enlarging mechanism for enlarging a shift amount of said corrective optical system; and a shift amount detecting sensor for detecting the shift amount enlarged by said shift amount enlarging mechanism.

65. An image deviation correcting optical apparatus according to claim 64, wherein said shift amount enlarging mechanism includes at least two rotating members.

66. An image deviation correcting optical apparatus according to claim 64, further comprising an actuator for driving said shift amount enlarging mechanism, a vibration sensor for detecting a vibration of the apparatus, and a driving controller for controlling said actuator based on outputs from said shift amount detecting sensor and said vibration sensor.

67. An image deviation correcting optical apparatus, comprising:

an optical system constituted partially by a corrective optical system;

a shift amount enlarging mechanism for enlarging a shift amount of said corrective optical system; and a balancer weight attached to said shift amount enlarging mechanism for balancing with the weight of said corrective optical system.

68. An image deviation correcting optical apparatus according to claim 67, wherein said balancer weight is disposed to an object side of said corrective optical system.

69. An image deviation correcting optical apparatus comprising:

an optical system constituted partially by a corrective optical system; and a driving mechanism for shifting said corrective optical system in relation to another optical element, said driving mechanism including a first Scott-Russel mechanism shifting said corrective optical system along a first direction in a plane perpendicular to an axis, and a second Scott-Russel mechanism to shift said corrective optical system along a different direction in said plane.

70. An image deviation correcting optical apparatus according to claim 69, wherein respective links of said first and second Scott-Russel mechanisms are substantially aligned in a direction of said axis.

71. An image deviation correcting optical apparatus comprising:

an imaging optical system constituted partially by a corrective optical system; and a driving mechanism for shifting said corrective optical system in relation to another optical element of said imaging optical system, said driving mechanism including a first member for inclining to effect a shift movement (D') of the corrective optical system along a direction perpendicular to an optical axis of said corrective optical system, said first member having an arm length (L1); and a second member for inclining with the inclination of said first member, said second member being connected to said first member at an arm length (L2) from an end of said first member and having an arm length (L3), wherein the following equation is satisfied $$L1 \times L3/L2 = f/A$$

where f is a focal distance of the imaging optical system, A is D/D', and D is an image movement amount on an image plane corresponding to the shift amount D' of said corrective optical system.

72. An image deviation correcting optical apparatus according to claim 71, wherein the arm length (L2) is less than the arm length (L1).

73. An image deviation correcting optical apparatus according to claim 71, wherein said driving mechanism has a member for adjusting the arm length (L3) of said second member.

74. An image deviation correcting optical apparatus according to claim 73, wherein said third member cooperates with a zoom adjusting member of the imaging optical system.

75. An image deviation correcting optical apparatus, comprising:

optical means constituted partially by a corrective optical means for correcting an image deviation;

movable means coupled to said corrective optical means;

driving means for driving said corrective optical means through said movable means;

means supporting said movable means to provide a corrective motion accompanying a rotational component when said driving means is driven;

angle variation detecting means fixed to said movable means for detecting rotation relative to a predetermined point of origin of an inertial system; and control means responsive to said angle variation detecting means for controlling the driving of said driving means such that said movable means is driven by said driving means to correct an image deviation due to angle variation of an optical axis of the apparatus as a result of the detected rotation;

said supporting means cooperating with said movable means for substantially maintaining a constant angular position of said movable means with respect to said predetermined point of origin.

76. An image deviation correcting optical apparatus, comprising:

optical means constituted partially by a corrective optical means for correcting an image deviation;

movable means coupled to said corrective optical means;

driving means for driving said corrective optical means through said movable means, said movable means being arranged to provide a corrective motion accompanying a rotational component when said driving means is driven;

angle variation detecting means fixed to said movable means for detecting rotation relative to a predetermined point of origin of an inertial system;

control means responsive to said angle variation detecting means for causing said driving means to drive said movable means in order to correct an image deviation due to angle variation of an optical axis of the apparatus as a result of the detected rotation; and adjusting means for adjusting a movement amount of said movable means such that when said movable means is driven to correct said image deviation, said movable means is substantially maintained in a constant angular position with respect to said predetermined point of origin.

77. An image deviation correcting optical apparatus, comprising:

optical means constituted at least partially by a corrective optical means which is movably supported in a plane perpendicular to an optical axis of the apparatus for correcting an image deviation;

movable means coupled to said corrective optical means;

driving means for driving said corrective optical means through said movable means;

means supporting said movable means to provide a corrective motion accompanying a rotational component when said driving means is driven;

angle variation detecting means fixed to said movable means for detecting rotation relative to a predetermined point of origin of an inertial system; and control means for controlling the driving of said driving means such that said movable means is driven to make an angle variation $-\theta$ with respect to said optical axis in conjunction with a shifting amount D' {D'=D/A (where A=a coefficient and D=an image shifting amount)} of the corrective optical means for correcting an image deviation amount d at a variation angle $\theta$ of said optical axis with respect to said predetermined point of origin {d=f·$\theta$ (where f=focal length of the entire optical means)};

said supporting means cooperating with said movable means for substantially maintaining a constant angular position of said movable means with respect to said point of origin in conjunction with the movement of said corrective optical means by the shifting amount D'.

78. An image deviation correcting optical apparatus, comprising:

corrective optical means for correcting for deviation of the optical axis of a lens barrel means;

driving shaft means for driving said corrective optical means;

fixing means fixed to said lens barrel means, with a first center axis of rotation and the sliding axis of slider receiving means of said fixing means being arranged in parallel with the optical axis of the lens barrel means;

driving arm means rotatively supported toward one end thereof at the first center axis of rotation of said fixing means and having a second center axis of rotation at a position spaced from the first center axis of rotation by a predetermined distance; and supporting means rotatively supported at the second center axis of rotation of said driving arm means, with slider means thereof which is slidable along said slider receiving means and said driving shaft means being mounted in alignment with positions on a straight line through the second center axis of rotation and the second center axis of rotation being centrally disposed between said positions at a distance from each position equal to said predetermined distance;

wherein said driving shaft means supported by said supporting means is structured so as to be shifted perpendicularly with respect to the optical axis of said lens barrel means by oscillating said driving arm means to shift said slider means slidably along said slider receiving means.

79. An image deviation correcting optical apparatus, comprising:

corrective optical means for correcting for deviation of the optical axis of a lens barrel means;

driving means including

A. driving shaft means for driving said corrective optical means;

B. fixing means fixed to said lens barrel means, with a first center axis of rotation and the sliding axis of slider receiving means of said fixing means being arranged in parallel with the optical axis of the lens barrel means;

C. driving arm means rotatively supported at the first center axis of rotation of said fixing means, and having a second center axis of rotation at a position spaced from the first center axis of rotation by a predetermined distance;

D. supporting means rotatively supported at the second center axis of rotation of said driving arm means, with slider means thereof which is slidable along said slider receiving means and said driving shaft means being mounted in alignment with positions on a straight line through the second center axis of rotation and the second center axis of rotation being centrally disposed between said positions at a distance from each position equal to said predetermined distance; and E. said driving shaft means supported by said supporting means being driven perpendicularly with respect to the optical axis of said lens barrel means by oscillating said driving arm means to shift said slider means slidably along said slider receiving means;

angle variation detecting means for detecting angular deviation of the optical axis of the lens barrel means; and control means responsive to said angle variation detecting means for controlling the driving of said driving means.

80. An image deviation correcting optical apparatus, comprising:

corrective optical means for correcting for angular deviation of an optical axis of a lens barrel means;

a pair of driving means for driving said corrective optical means, said pair of driving means supporting said corrective optical means within a plane perpendicular to said optical axis and respectively along directions perpendicular to each other, said pair of driving means limiting inclination of said corrective optical means with respect to said plane perpendicular to the optical axis, one of said driving means acting to guide said corrective optical means driven by the other driving means; and movement detection means provided on at least one said driving means, at a position for enlarging a shift amount of said corrective optical means, for detecting the enlarged shift amount.

81. An image deviation correcting optical apparatus, comprising:

imaging optical means constituted partially by a corrective optical means; and driving means for shifting said corrective optical means in relation to another optical element of said imaging optical means, said driving means including rotationally moving means having a radius of rotation (R) and rotationally moving to effect a shift movement (D') of the corrective optical means along a direction perpendicular to an optical axis of said corrective optical means, wherein the following equation is satisfied $R=f/A$ where f is a focal distance of the imaging optical means, A is D/D', and D is an image movement amount on an image plane corresponding to the shift amount D' of said corrective optical means.

82. An image deviation correcting optical apparatus, comprising:

imaging optical means constituted partially by a corrective optical means; and driving means for shifting said corrective optical means in relation to another optical element of said imaging optical means, said driving means including rotationally moving means for rotationally moving around a rotation center disposed to an image-plane side of said corrective optical means to effect a shift movement of said corrective optical means along a direction perpendicular to an axis of said corrective optical means.

83. An image deviation correcting optical apparatus, comprising:

imaging optical means constituted partially by a corrective optical means; and driving means for shifting said corrective optical means in relation to another optical element of said imaging optical means, said driving means including rotationally moving means for rotationally moving by an angle $(-\theta)$ relative to a predetermined axis to effect a shift movement of said corrective optical means by an amount (D') along a direction perpendicular to an optical axis of said corrective optical means, wherein the following equation is satisfied $$-\theta = D' \times A/f$$

where f is a focal distance of the imaging optical means, A is D/D', and D is an image movement amount on an image plane corresponding to the shift amount D' of said corrective optical means.

84. An image deviation correcting optical apparatus, comprising:

imaging optical means constituted partially by a corrective optical means; and driving means for shifting said corrective optical means in relation to another optical element of said imaging optical means, said driving means including first means for inclining by an angle $(\phi)$ relative to a predetermined axis to effect a shift movement (D') of said corrective optical means along a direction perpendicular to an optical axis of said corrective optical means, and second means connected to said first means for inclining by an angle $(\eta)$ relative to said predetermined axis with the inclination of said first means by the angle $(\phi)$ wherein the following equation is satisfied $$\eta = D' \times A/f$$

where f is a focal distance of the imaging optical means, and A is D/D', and D is an image movement amount on an image plane corresponding to the shift amount D' of said corrective optical means.

85. An image deviation correcting optical apparatus comprising:

imaging optical means constituted partially by a corrective optical means; and driving means for shifting said corrective optical means in relation to another optical element of said imaging optical means, said driving means including first means for inclining to effect a shift movement (D') of the corrective optical means along a direction perpendicular to an optical axis of said corrective optical means, said first means having an arm length (L1); and second means for inclining with the inclination of said first means, said second means being connected to said first means at an arm length (L2) from an end of said first means and having an arm length (L3), wherein the following equation is satisfied $$L1 \times L3/L2 = f/A$$

where f is a focal distance of the imaging optical means, A is D/D', and D is an image movement amount on an image plane corresponding to the shift amount D' of said corrective optical means.

86. An image deviation correcting optical apparatus, comprising:

optical means constituted partially by a corrective optical means;

shift amount enlarging means for enlarging a shift amount of said corrective optical means; and shift amount detecting means for detecting the shift amount enlarged by said shift amount enlarging means.

87. An image deviation correcting optical apparatus, comprising:

optical means constituted partially by a corrective optical means;

shift amount enlarging means for enlarging a shift amount of said corrective optical means; and balancer weight means attached to said shift amount enlarging means for balancing with the weight of said corrective optical means.

88. An image deviation correcting optical apparatus comprising:

optical means constituted partially by a corrective optical means; and driving means for shifting said corrective optical means in relation to another optical element, said driving means including a first Scott-Russel mechanism means shifting said corrective optical means along a first direction in a plane perpendicular to an axis, and a second Scott-Russel mechanism means to shift said corrective optical means along a different direction in said plane.

89. A method of correcting an image deviation, comprising the steps of:

shifting a corrective optical system partially constituting an imaging optical system by a distance (D') in relation to an optical axis of the imaging optical system; and moving a coupling member along said optical axis in synchronization with the shifting motion of said corrective optical system, so that the coupling member moves along an arc having a radius (R) around a predetermined point on said optical axis;

wherein the following equation is satisfied $$R = f/A$$

where f is a focal distance of the imaging optical system, A is D/D', and D is an image movement amount on an image plane corresponding to the shift amount D' of the corrective optical system.

90. A method of correcting an image deviation according to claim 89, wherein a center of shifting movement of said coupling member along said arc is disposed to an image-plane side of the corrective optical system.

91. A method of correcting an image deviation according to claim 89, further comprising the steps of detecting a shift angle of said coupling member about said center of movement and controlling the shifting movement of said coupling member in accordance with the detected shift angle.

92. A method of correcting an image deviation according to claim 91, wherein the controlling is effected such that a result of the detecting approaches a static result.

93. A method of correcting an image deviation according to claim 91, wherein the controlling continues until a result of the detecting is static.

94. A method of correcting an image deviation according to claim 91, wherein the detecting is made by an angle velocimeter.

95. A method of correcting an image deviation according to claim 94, wherein the controlling is effected such that a result of the detecting approaches a static result.

96. A method of correcting an image deviation according to claim 94, wherein the controlling continues until a result of the detecting is static.

97. An image shake correction optical apparatus, comprising:

a correction optical system constituting a part of an optical system; and a shift mechanism for shifting said correction optical system within a plane perpendicular to an optical axis;

wherein said shift mechanism includes a supporting member for supporting said correction optical system, and a guide mechanism for movably guiding said supporting member, said guide mechanism includes first and second rod-like elements disposed outside of a diameter of a lens of said correction optical system, positioned asymmetrically to the optical axis, and extending, respectively, in first and second directions within the plane perpendicular to the optical axis, and said correction optical system is independently moved in said first direction with guiding by said first rod-like element, and in said second direction with guiding by said second rod-like element.

98. An image shake correction optical apparatus according to claim 97, wherein each said rod-like element has a cylindrical shape, and said first and second directions are perpendicular to each other.

99. An image shake correction optical apparatus according to claim 97, wherein said first rod-like element is moved in said second direction when said correction optical system is guided to move in said second direction.

100. An image shake correction optical apparatus, comprising:

a correction optical system constituting a part of an optical system; and an actuator mechanism for shifting said correction optical system within a plane perpendicular to an optical axis;

wherein said actuator mechanism includes:

first and second rod-like elements for guiding said correction optical system, said first and second rod-like elements being disposed radially outside of a diameter of a lens of said correction optical system, being positioned asymmetrically to the optical axis, and extending, respectively, in first and second directions within the plane perpendicular to the optical axis;

a first actuator for driving along said first direction said correction optical system guided by said first rod-like element; and a second actuator for driving along said second direction said correction optical system guided by said second rod-like element.

101. An image shake correction optical apparatus according to claim 100, wherein each said rod-like element has a cylindrical shape, and said first and second directions are perpendicular to each other.

* * * * *